United States Patent
Wiklof et al.

(10) Patent No.: US 7,530,498 B2
(45) Date of Patent: May 12, 2009

(54) WIRELESS INTERFACE AND METHOD FOR ENHANCED FUNCTIONALITY

(75) Inventors: Christopher A. Wiklof, Everett, WA (US); Gregory T. Gibson, Snohomish, WA (US); Edward M. Millet, Lake Forest Park, WA (US); Scott A. Ellerthorpe, San Francisco, CA (US)

(73) Assignee: Microvision, Inc., Redmond, WA (US)

( * ) Notice: Subject to any disclaimer, the term of this patent is extended or adjusted under 35 U.S.C. 154(b) by 288 days.

(21) Appl. No.: 11/725,989

(22) Filed: Mar. 19, 2007

(65) Prior Publication Data

US 2007/0249383 A1    Oct. 25, 2007

Related U.S. Application Data

(63) Continuation of application No. 10/794,159, filed on Mar. 5, 2004, now Pat. No. 7,377,441.

(51) Int. Cl.
*G06K 7/10* (2006.01)
(52) U.S. Cl. .................. 235/472.02; 235/472.01; 235/462.46
(58) Field of Classification Search ............ 235/472.02, 235/472.01, 462.46, 462.45; 455/411, 572, 455/575
See application file for complete search history.

(56) References Cited

U.S. PATENT DOCUMENTS

| | | | |
|---|---|---|---|
| 5,771,448 A | 6/1998 | Cooper | |
| 6,212,410 B1 | 4/2001 | Ishida | |
| 6,265,844 B1 | 7/2001 | Wakefield | |
| 6,538,413 B1 | 3/2003 | Beard et al. | |
| 6,543,695 B1 | 4/2003 | Hamilton et al. | |
| 6,820,812 B2 | 11/2004 | Bhatia et al. | |
| 6,832,729 B1 | 12/2004 | Perry et al. | |
| 7,140,546 B1 | 11/2006 | Terlizzi et al. | |
| 2001/0051766 A1 | 12/2001 | Gazdzinski | |
| 2003/0070085 A1 | 4/2003 | Silvester | |
| 2003/0087681 A1* | 5/2003 | Sackett et al. | 455/574 |
| 2004/0117254 A1 | 6/2004 | Nemirofsky et al. | |
| 2004/0259542 A1* | 12/2004 | Viitamaki et al. | 455/426.2 |
| 2004/0263117 A1 | 12/2004 | Kogan et al. | |
| 2005/0009469 A1 | 1/2005 | Kotola | |
| 2005/0169201 A1* | 8/2005 | Huylebroeck | 370/311 |
| 2006/0046779 A1 | 3/2006 | Tracy et al. | |
| 2006/0189359 A1 | 8/2006 | Kammer | |
| 2007/0105548 A1* | 5/2007 | Mohan et al. | 455/426.1 |

* cited by examiner

*Primary Examiner*—Edwyn Labaze
(74) *Attorney, Agent, or Firm*—Kevin D. Wills

(57) ABSTRACT

A portable end device, such as a bar code scanner, may be equipped with auxiliary interfaces. The auxiliary interfaces may be easily added to the end device as a replaceable cover, such as a replaceable battery door. A signal path conducts signals to and from the replaceable cover. One auxiliary interface is a Bluetooth radio. Data integrity protocols may be selected to guarantee delivery and guarantee no duplicate deliveries. Host pairing algorithms may provide standard or strong pairing with a host computer. Ergonomic interface features allow a user to control and monitor the operation of the end device and the data link with minimal hardware cost and battery life impact. Host software programs provide data routing, automatic reestablishment of the data link, and other functions. The system is adaptable to a wide array of use environments through the selection of timer parameters in the end device.

15 Claims, 15 Drawing Sheets

WIRELESS INTERFACE AND METHOD FOR ENHANCED FUNCTIONALITY

CROSS REFERENCES TO RELATED APPLICATIONS

This is a continuation and claims priority benefit under 37 CFR § 1.20 from U.S. patent application Ser. No. 10/794,159, at the time of this application and filed Mar. 5, 2004 now U.S. Pat. No. 7,377,441.

The present application claims priority from and incorporates by reference the co-pending application entitled "ELECTRONIC DEVICE WITH AUXILIARY INTERFACES", Ser. No. 10/794,159 applied for on Mar. 5, 2004, invented by Wiklof et al.

TECHNICAL FIELD

The present disclosure relates to wireless interfaces, and more particularly to radio interfaces with portable electronic devices.

BACKGROUND

Automatic data collection is used in many sectors of our economy. In many applications, data collection devices such as bar code scanners or radio frequency interrogators are connected to a host or client computer system that processes the data they collect. Some data collection devices communicate through a wired interface. Other models may be used in a store-and-forward or batch mode. Still others interface to the host or client computer via a wireless interface such as a radio or infrared interface.

While there are many choices of interfaces available to the user, they are often not interchangeable. For example, if a user wishes to have a bar code scanner with a radio interface, that scanner may not operate or may not be convenient to operate in a directly connected wired mode.

In other cases, if a user wishes to have an option of using various interfaces in the future, it may be necessary to purchase a more expensive scanner than might otherwise be required or else purchase a completely new scanner to make such a change. For example, if a user purchases a portable scanner in a batch mode, collecting data for subsequent upload to a host or client system, but later decides it best to operate in a wireless mode, it is frequently necessary to purchase a completely new scanner, thus effectively losing the original investment in the batch scanner.

In some cases, adapters may be available for adding a new interface. In particular, there are some third-party radios that a wired-interface data collection device may be connected to add a wireless interface. Unfortunately, such adapters are frequently bulky or ungainly so as to harm the ergonomics of the data collection device. In addition, there may be problems with interface reliability when switching between interface modes. For example, a third-party radio adaptor may be prone to dropping messages, a flaw that may be quite significant in many applications.

With data collection devices and other portable electronic devices that do have a radio interface, there may be shortcomings in operation that adversely affect the use experience. For example, it is frequently inconvenient to add devices, change end device to host pairing, and un-pair devices for use with a different host. Other systems suffer from the inconvenience of dropping and not restarting communication sessions when the end device temporarily moves out of radio range. Still other systems, consume more power than is optimum by staying in a "sniff" or other mode for long periods of time when there is no data transmitted. Other systems may suffer from end devices that re-pair with the wrong host rather than making a strong enough connection to the intended host to prevent such a possibility.

Several radio interface standards are available for use with portable electronic devices. These include spread-spectrum radio standards that are especially immune to interference and may be used in unlicensed environments. These include IEEE 802.11a, 802.11b, 802.11g, and Bluetooth™. The book entitled, "Bluetooth™ Connect Without Cables", by Jennifer Bray and Charles F. Sturman, published by Prentice Hall PTR, 2001, hereby incorporated by reference, contains information useful for understanding radio data interfaces, and particularly Bluetooth.

OVERVIEW

Various aspects according to the present invention are related to data collection devices and other portable electronic devices that communicate via a variety of interfaces. In some embodiments, an auxiliary interface may be added at any point during the device's operational life by substituting an interchangeable door, such as a battery door, with another that is equipped with elements of the auxiliary interface.

In other aspects, radio interface systems, such as Bluetooth radio systems, are provided with enhanced capabilities and reduced human interface hardware cost while maintaining good user feedback.

An aspect according to the invention relates to an end device such as a bar code scanner that has a native interface. An auxiliary interface may be used in place of or as an adjunct to the native interface. In some embodiments, and interface, memory, or other module may be easily connected to the end device. When an end device includes a battery compartment with the door, the battery door may be made replaceable and interchangeable with accessory battery doors. According to one embodiment, the battery door includes a Bluetooth radio module.

In another aspect according to the invention, data integrity may be maintained by the implementation of various levels of transmission guarantee. In one level of guaranteed transmission, an ACK/NAK protocol may be used between the end device and a host application to ensure receipt of data transmitted. In another level of guaranteed data integrity, a low level host program such as a Bluetooth Manager may be used to monitor transmission sequence numbers from the end device. By labeling each transmission with a sequence number, the Bluetooth Manager may ensure that duplicate messages are not received by the host application.

In another aspect according to invention, various pairing strengths between and devices and computers may be enabled. In some embodiments, a hardware-independent code may be issued to identify a particular pairing. In other embodiments a hardware-specific number such as a host Bluetooth Device number (or BD number) may be used to label the connection and ensure pairing between a particular host and a particular end device.

In another aspect according to the invention, a bar code scanner with a radio may alter its laser scanning modes upon completing a decode.

In yet another aspect according to the invention, a data collection device or other end device may be particularly energy efficient through the use of various low-power modes of operation.

In another aspect, an end device and host computer system will may allow for roaming in and out of radio range with automatic reconnection when the scanner reenters radio range.

In another aspect according to the invention, an end device can differentiate between whether or not a set of data reached its intended host computer, storing non-received data in memory until connection can be made. Connection may be automatically re-attempted at intervals under control of the user.

In still another aspect according to the invention, an end device with no display is able to provide the user with information about its wireless connections status, status of data flow, and receipt of data by a host application.

In another aspect, the user may easily un-pair from particular host computer and re-pair as wished with another host. Such un-paring may be accomplished without keystrokes or access to a complex input device such as a touch screen, accomplished instead by the push of a trigger or button used to initiate data collection.

In another aspect according to the invention, multiple Bluetooth data collection devices may be used in a single environment, each data collection device being paired according to the application needs. The system ensures that end devices do not disconnect from their intended host and reconnect with an unintended host, ensuring integrity of the data connection and associating scan data with an appropriate host and appropriate application.

In another aspect according to the invention, an end device may receive pairing information via a secure wired connection and maintain pairing until unpaired via a secure connection.

In another aspect, an end device may contain a list of qualified hosts. The device may then pair with any of the qualified hosts but refuse to pair with hosts that have not been assigned.

In still another aspect according to the invention, an end device may be enabled to pair with a host within range, allowing it to roam about an environment, collecting data whether or not it is in a radio range, and then pairing with the first qualified host it encounters. The number of qualified hosts may be large or as small as one.

DETAILED DESCRIPTION

Many aspects according to the invention relate to portable electronic devices in general. Other aspects may relate more specifically to portable data collection devices. Several forms of portable data collection devices are in widespread use, the most familiar likely being portable bar code scanners and portable radio frequency identification (RFID) interrogators. For convenience and clarity, many of the examples in this document are drawn to bar code scanners.

Figure 1:
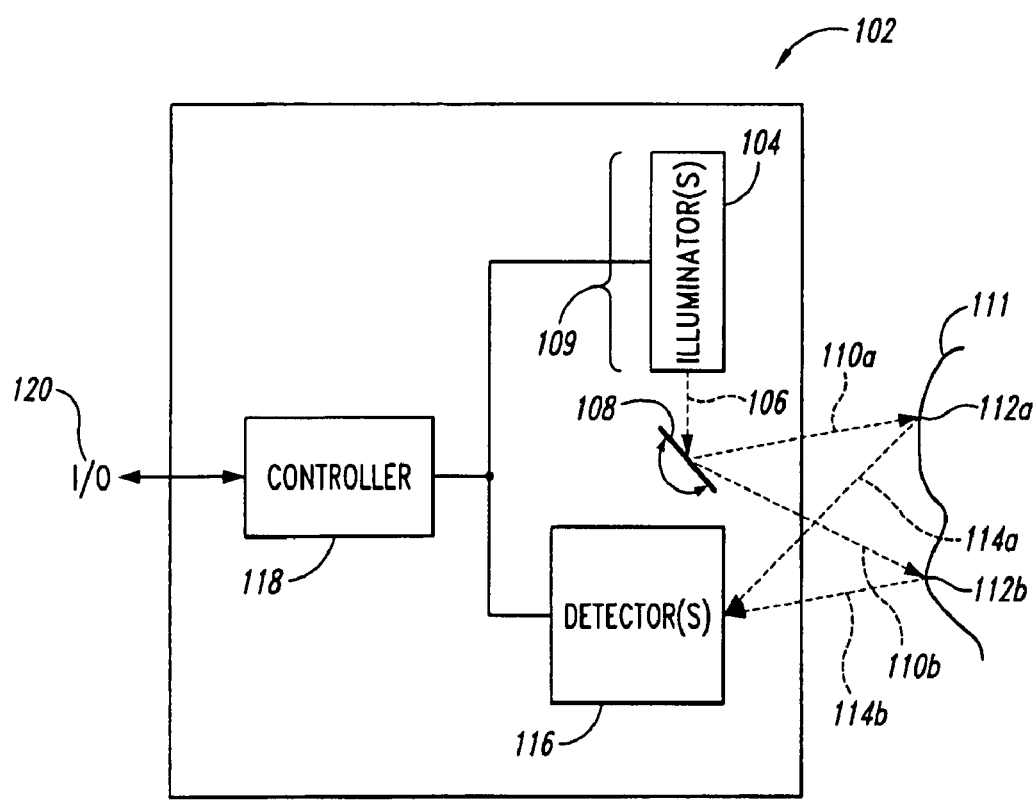
FIG. 1 is a block diagram of a simple bar code scanner.

To aid the reader in understanding the exemplary field of data collection as applied to bar code scanning, a review of that technology is offered beginning with FIG. 1, which shows a block diagram of a bar code scanner 102. An illuminator 104 creates a first beam of light 106. A scanner 108 deflects the first beam of light across a field-of-view (FOV) to produce a second scanned beam of light 110. Taken together, the illuminator 104 and scanner 108 comprise a variable illuminator 109. Instantaneous positions of scanned beam of light 110 may be designated as 110a, 110b, etc. The scanned beam of light 110 sequentially illuminates spots 112 in the FOV. Spots 112a and 112b in the FOV are illuminated by the scanned beam 110 at positions 110a and 110b, respectively. While the beam 100 illuminates the spots, a portion of the illuminating light beam 100 is reflected according to the properties of the object or material at the spots to produce scattering or reflecting the light energy. A portion of the scattered light energy travels to one or more detectors 116 that receive the light and produce electrical signals corresponding to the amount of light energy received. The electrical signals drive a controller 118 that builds up a digital representation and transmits it for further processing, decoding, archiving, printing, display, or other treatment or use via interface 120.

According to one aspect of the invention, the light source 104 may include multiple emitters such as, for instance, light emitting diodes (LEDs), lasers, thermal sources, arc sources, fluorescent sources, gas discharge sources, or other types of illuminators. In one embodiment, illuminator 104 comprises a red laser diode having a wavelength of approximately 635 to 670 nanometers (nm). In another embodiment, illuminator 104 comprises three lasers; a red diode laser, a green diode-pumped solid state (DPSS) laser, and a blue DPSS laser at approximately 635 nm, 532 nm, and 473 nm, respectively. While laser diodes may be directly modulated, DPSS lasers generally require external modulation such as an acousto-optic modulator (AOM) for instance. In the case where an external modulator is used, it is typically considered part of light source 104. Light source 104 may include, in the case of multiple emitters, beam combining optics to combine some or all of the emitters into a single beam. Light source 104 may also include beam-shaping optics such as one or more collimating lenses and/or apertures. Additionally, while the wavelengths descried in the previous embodiments have been in the optically visible range, other wavelengths may be within the scope of the invention.

Light beam 106, while illustrated as a single beam, may comprise a plurality of beams converging on a single scanner 108 or onto separate scanners 108.

Scanner 108 may be formed using many known technologies such as, for instance, a rotating mirrored polygon, a mirror on a voice-coil as is used in miniature bar code scanners such as used in the Symbol Technologies SE 900 scan engine, a mirror affixed to a high speed motor or a mirror on a bimorph beam as described in U.S. Pat. No. 4,387,297 entitled PORTABLE LASER SCANNING SYSTEM AND SCANNING METHODS, an in-line or "axial" gyrating, or "axial" scan element such as is described by U.S. Pat. No. 6,390,370 entitled LIGHT BEAM SCANNING PEN, SCAN MODULE FOR THE DEVICE AND METHOD OF UTILIZATION, a non-powered scanning assembly such as is described in U.S. patent application Ser. No. 10/007,784, SCANNER AND METHOD FOR SWEEPING A BEAM ACROSS A TARGET, commonly assigned herewith, a MEMS scanner, or other type. All of the patents and applications referenced in this paragraph are hereby incorporated by reference A MEMS scanner may be of a type described in U.S. Pat. No. 6,140,979, entitled SCANNED DISPLAY WITH PINCH, TIMING, AND DISTORTION CORRECTION; U.S. Pat. No. 6,245,590, entitled FREQUENCY TUNABLE RESONANT SCANNER AND METHOD OF MAKING; U.S. Pat. No. 6,285,489, entitled FREQUENCY TUNABLE RESONANT SCANNER WITH AUXILIARY ARMS; U.S. Pat. No. 6,331,909, entitled FREQUENCY TUNABLE RESONANT SCANNER; U.S. Pat. No. 6,362,912, entitled SCANNED IMAGING APPARATUS WITH SWITCHED FEEDS; U.S. Pat. No. 6,384,406, entitled ACTIVE TUNING OF A TORSIONAL RESONANT STRUCTURE; U.S. Pat. No. 6,433,907, entitled SCANNED DISPLAY WITH PLURALITY OF SCANNING ASSEMBLIES; U.S. Pat. No. 6,512,622, entitled ACTIVE TUNING OF A TORSIONAL RESONANT STRUCTURE; U.S. Pat. No. 6,515,278, entitled FREQUENCY TUNABLE RESONANT SCANNER AND METHOD OF MAKING; U.S. Pat. No. 6,515,781, entitled SCANNED IMAGING APPARATUS WITH SWITCHED FEEDS; and/or U.S. Pat. No. 6,525,310, entitled FREQUENCY TUNABLE RESONANT SCANNER; for example; all commonly assigned herewith and all hereby incorporated by reference.

Alternatively, illuminator 104, scanner 108, and/or detector 116 may comprise an integrated beam scanning assembly as is described in U.S. Pat. No. 5,714,750, BAR CODE SCANNING AND READING APPARATUS AND DIFFRACTIVE LIGHT COLLECTION DEVICE SUITABLE FOR USE THEREIN which is incorporated herein by reference.

In the case of a one-dimensional (1D) scanner, the scanner is driven to scan output beams 110 along a single axis. In the case of a two-dimensional (2D) raster scanner or scanned-beam imager, scanner 108 is driven to scan output beams 110 along a plurality of axes so as to sequentially illuminate a 2D FOV 111. 2D raster scanners generally output a series of vertically spaced-apart scan lines while 2D imagers output a large enough number of scan lines to illuminate substantially the entire FOV with vertical spacing between scan lines approximately equal to horizontal spacing between pixels (although 2D scanned beam imagers need not pixelate on the horizontal axis). The alignment of the fast scan axis horizontally and the slow scan axis vertically may be reversed or otherwise altered according to application needs or designer preferences.

For the case of 2D imaging, a MEMS scanner is often preferred, owing to the high frequency, durability, repeatability, and/or energy efficiency of such devices. A bulk micro-machined or surface micro-machined silicon MEMS scanner may be preferred for some applications depending upon the particular performance, environment or configuration. Other embodiments may be preferred for other applications.

A 2D MEMS scanner 108 scans one or more light beams at high speed in a pattern that covers an entire 2D FOV or a selected region of a 2D FOV within a frame period. A typical frame rate may be 60 Hz, for example. Often, it is advantageous to run one or both scan axes resonantly. In one embodiment, one axis is run resonantly at about 19 KHz while the other axis is run non-resonantly in a sawtooth pattern to create a progressive scan pattern. A progressively scanned bi-directional approach with a single beam, scanning horizontally at scan frequency of approximately 19 KHz and scanning vertically in sawtooth pattern at 60 Hz can approximate an SVGA resolution. In one such system, the horizontal scan motion is driven electrostatically and the vertical scan motion is driven magnetically. Alternatively, both the horizontal scan may be driven magnetically or capacitively. Electrostatic driving may include electrostatic plates, comb drives or similar approaches. In various embodiments, both axes may be driven sinusoidally or resonantly.

Several types of detectors may be appropriate, depending upon the application or configuration. For example, in one embodiment, the detector may include a PIN photodiode connected to an amplifier and digitizer. In this configuration, beam position information is retrieved from the scanner or, alternatively, from optical mechanisms, and image resolution is determined by the size and shape of scanning spot 112. In the case of multi-color imaging, the detector 116 may comprise more sophisticated splitting and filtering to separate the scattered light into its component parts prior to detection. As alternatives to PIN photodiodes, avalanche photodiodes (APDs) or photomultiplier tubes (PMTs) may be preferred for certain applications, particularly low light applications.

In various approaches, photodetectors such as PIN photodiodes, APDs, and PMTs may be arranged to stare at the entire FOV, stare at a portion of the FOV, collect light retro-collectively, or collect light confocally, depending upon the application. In some embodiments, the photodetector 116 collects light through filters to eliminate much of the ambient light.

The device may be embodied as monochrome, as full-color, and even as a hyper-spectral. In some embodiments, it may also be desirable to add color channels between the conventional RGB channels used for many color cameras. Herein, the term grayscale and related discussion shall be understood to refer to each of these embodiments as well as other methods or applications within the scope of the invention. In the control apparatus and methods described below, pixel gray levels may comprise a single value in the case of a monochrome system, or may comprise an RGB triad or greater in the case of color or hyperspectral systems. Control may be applied individually to the output power of particular channels (for instance red, green, and blue channels) or may be applied universally to all channels, for instance as luminance modulation.

Figure 2:
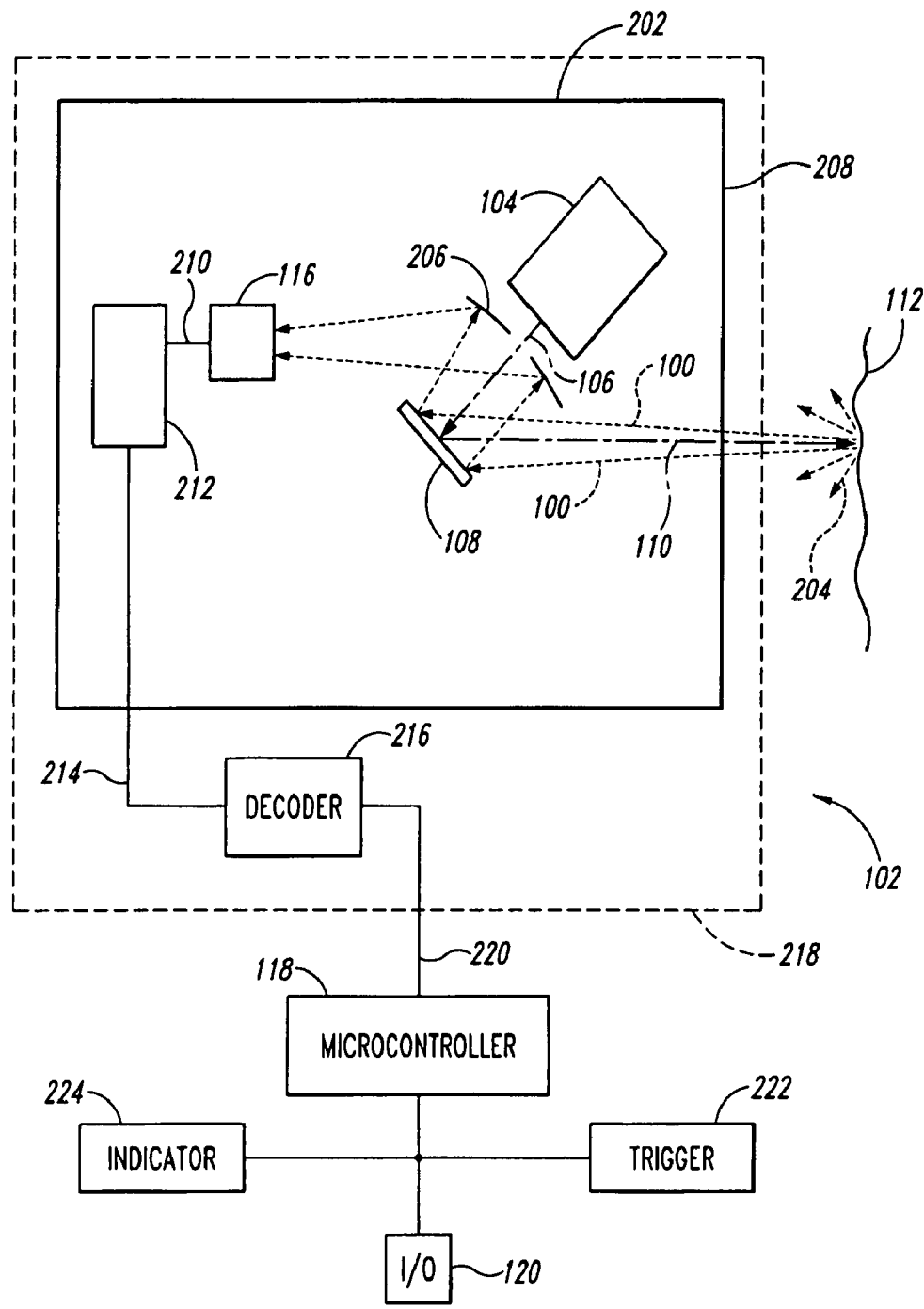
FIG. 2 is a block diagram of a bar code scanner having a scan engine architecture.

Frequently, modern designs of bar code scanners use a modular approach such as that shown in the block diagram of FIG. 2. Analog output scan engine 202 comprises a laser scanner 104 that produces a beam 106. Beam 106 impinges on scan mirror 108, which forms scan beam 110. Scan beam 110 scans back and forth across the field of view 112. Spots are illuminated by scanning beam 110 produce scattered light 200, a portion of which returns to scanner 108 as scattered signal 100. In some scan engines the return light is de-scanned by the scanner and focused upon the detector 116. In the example of FIG. 2, scattered signal 100 is reflected by scan mirror 108, onto gathering mirror 206, and then onto detector 116.

Electrical circuit 212 creates an output signal 214 from weak signals 210 typically produced by a detector 116. In some embodiments, electrical circuit 212 may be integrated into detector 116. The output signal 214 may be analog or digital. To make a digital signal, electrical circuit 212 may include an analog-to-digital converter.

While a retro-collective schema is shown in FIG. 2, other arrangements including staring detection and confocal detection may be desirable for some embodiments.

The assembly comprising laser diode 104, scan mirror 108, gathering mirror 106, detector 116, and electrical circuit 212 may be packaged inside a chassis 202. Outgoing scan beam 110 and return signal 100 may pass through a front window 208. Frequently, window 208 is made of a filter material that passes light at the wavelength of the laser diode 104 and attenuates light at different wavelengths. This helps to reject ambient light and improve the signal-to-noise ratio at detector 116.

Detector 116 outputs a raw analog signal 210, which may or may not be exposed, depending upon whether or not electrical circuit 212 is integrated into detector 116. Electrical circuit 212 may include an amplifier and, optionally, may also include analog to digital converter. Electrical circuit 212 outputs signal 214, which may be either analog or digital according to the preference of the designer. Signal 214 is fed to decoder 216, which decodes the image of the indicia into a character string. For the case of a linear bar code scanner and a linear or 2D stacked symbol, the information is decoded from the widths of the bars and spaces of the symbol. For the case of a 2D imager and a 2D matrix symbol, the information is decoded from the sense (mark or absence of mark) in the matrix positions of the symbol. OCR, laser card, mark-sense forms, and other forms of printed or marked indicia have their own decode algorithms that may be applied by decoder 216.

Scan engine 202 represents one type of data collection engine that may be used in a hand-held or other device. It is anticipated that data collection engine 202 could be either linear scanning or 2D scanning, including a 2D imaging scanner. Alternatively, data collection engine 202 could be another type of data collection engine, including but not limited to a radio frequency interrogator, a CCD or CMOS imager, a microphone or other audio pick-up, a magnetic stripe reader, a MICR reader, or other device.

In some embodiments scan engine or data collection engine 202 may be combined with decoder 216 into an assembly 218. In many cases, assembly 218 is also referred to as a scan engine or data collection engine. The terms of art may be differentiated by reference to assembly 202 as an undecoded scan engine (or data collection engine) and assembly 218 as a decoded scan engine (or data collection engine).

Decoder 216 outputs decoded signal 220, which is received by microcontroller 118. In addition to receiving the decoded signal, microcontroller 118 also controls the functions of the data collection engine including those of the light source 104, the scanner 108, detector 116, electrical circuit 212, and decoder 216. The functions controlled by microcontroller 118 may range from as simple as turning on the components to more sophisticated functions such as establishing operational parameters, fault monitoring, etc.

In some applications it may be advantageous to combine decoder 216 into microcontroller 118. In those cases microcontroller 118 may receive output line 214 directly from electrical circuit 212.

It may be convenient to control the actions of microcontroller 118 with a trigger 222. When trigger 222 is pulled, microcontroller 118 energizes the data collection engine. For the example of FIG. 2, this may include energizing the laser diode 104, scan mirror 108, detector 116, electrical circuit 212, and decoder 216. As an alternative to microcontroller 118 directly controlling the activities of all components of data capture engine 202 or 218, the image capture engine itself may contain a microcontroller that performs functions otherwise associated with microcontroller 118.

As an alternative to triggered operation, the device may be automatically triggered, such as by a low power detection mode, a photocell, a proximity sensor, or other methods known to the art.

It is also possible to trigger the device through the main or auxiliary interface. For example, a Bluetooth trigger, proximity sensor, photocell, etc. could transmit the trigger signal via a Bluetooth interface.

When a good decode is made, indication may be made on indicator 224, which may include a display, one or more LEDs, a beeper, and/or other means to notify the user that a decode has been made. After decoding, microcontroller 118 may transmit the decoded message to host computer via interface 120. Alternatively, microcontroller 118 may include memory to store decoded symbols, doing so preferentially or when communication cannot be established with a host computer. In that case it may be advantageous to accumulate a number of scans in memory, for instance as the user moves through a warehouse, manufacturing floor, or other facility, and then later upload the decoded symbols as a batch through interface 120. When the memory accumulates multiple decodes and then later uploads the data through an interface, it may be referred to interchangeably as batch mode or store-and-forward mode.

Figure 3:
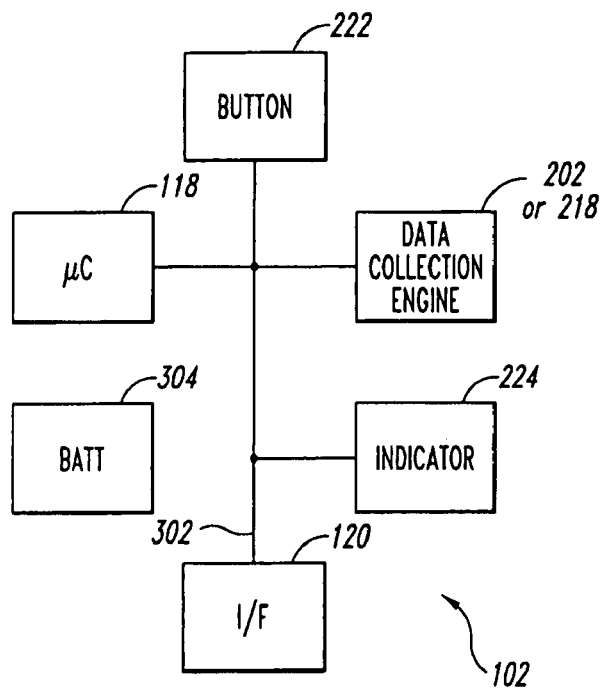
FIG. 3 is a block diagram of a portable data collection apparatus that is powered by a battery.

For convenience, data collection engine 202 or decoded data collection engine 218 may be shown in block diagram form such as is indicated in FIG. 3. Microcontroller 118 may be connected to data collection engine 202 or 218 via a bus 302. Here and elsewhere, objects 202 and 218 may be referred to interchangeably as a scan engine or a data collection engine. As described earlier, a primary difference between a scan engine 218 and scan engine 202 is that scan engine 218 includes the components of scan engine 202 plus a decoder 216. Button 222 may comprise a trigger, a button, an emitter/detector apparatus, or other feature for instructing the data collection device 102 to collect data. Indicator 224 may be used to notify the user of a good decode and other functions. Decoded symbols may be passed to host system via interface 120. A battery, fuel cell, or other power source 304 may be used to power the data collection device 102 when the system is not connected to host computer.

Microcontroller 118 may include memory 306. Alternatively, memory may be embodied as a separate device on bus 302. The memory is preferably nonvolatile, although in some applications a volatile memory may be used.

Figure 4:
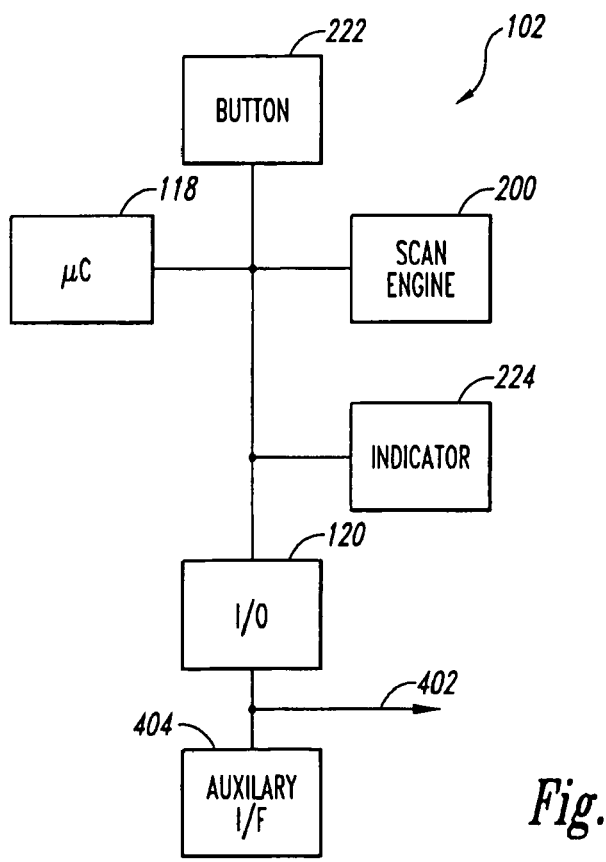
FIG. 4 is a block diagram of a bar code scanner having an auxiliary interface.

FIG. 4 is a block diagram of an alternative embodiment of data collection apparatus 102 that includes an auxiliary interface 404. Microcontroller 118 is connected to scan engine 202, button 222, indicator 224 and interface 120 as shown in earlier figures. Interface 120 may be used to communicate either directly to a host computer via data communication line 402, or alternatively may communicate with auxiliary interface 404. Auxiliary interface 404 may include any of several interfaces. These may include various radio modules, alternative wired interfaces, infrared interfaces, or other interfaces for communicating with an attached or remote host.

Figure 5A:
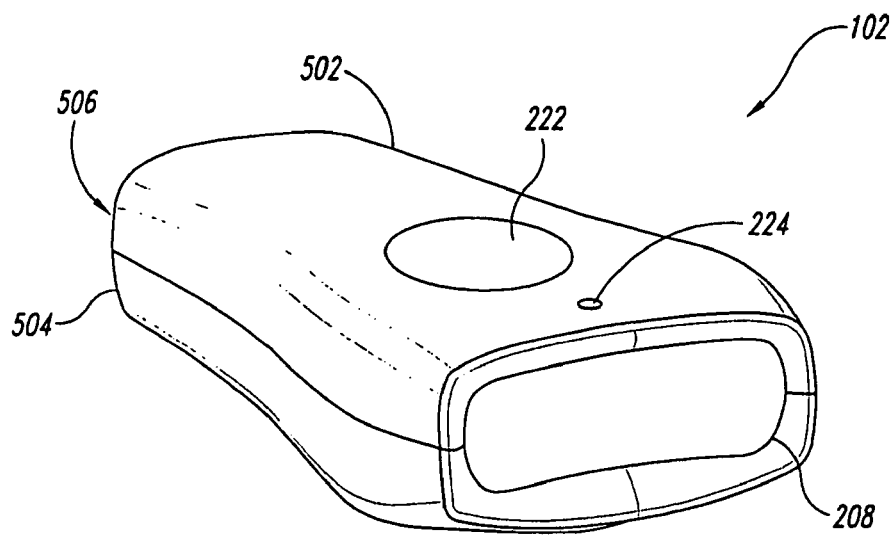
FIG. 5A is an isometric view of a bar code scanner.

A portable hand held bar code scanner may have a physical embodiment such as that of FIG. 5A. Scanner 102 includes a body 502 which may be hand held. A button 222 is placed at a location accessible to the user. Front window 208 protects the mechanism inside body 502 from exterior forces such as dust, shock, heat, and other insults, while allowing for the passage of light at the wavelength emitted by the laser diode. An indicator LED 224 is mounted on the top of body 502 front of button 222, were may be easily seen by the user. A battery door 504 covers a compartment that may contain one or more batteries to power the scanner 102. Not visible in FIG. 5A is physical interface port 506 on the back of the scanner. While in principle many different connectors could be used, the scanner of FIG. 5A uses a stereo jack variant of a serial interface to couple to a host computer.

Figure 5B:
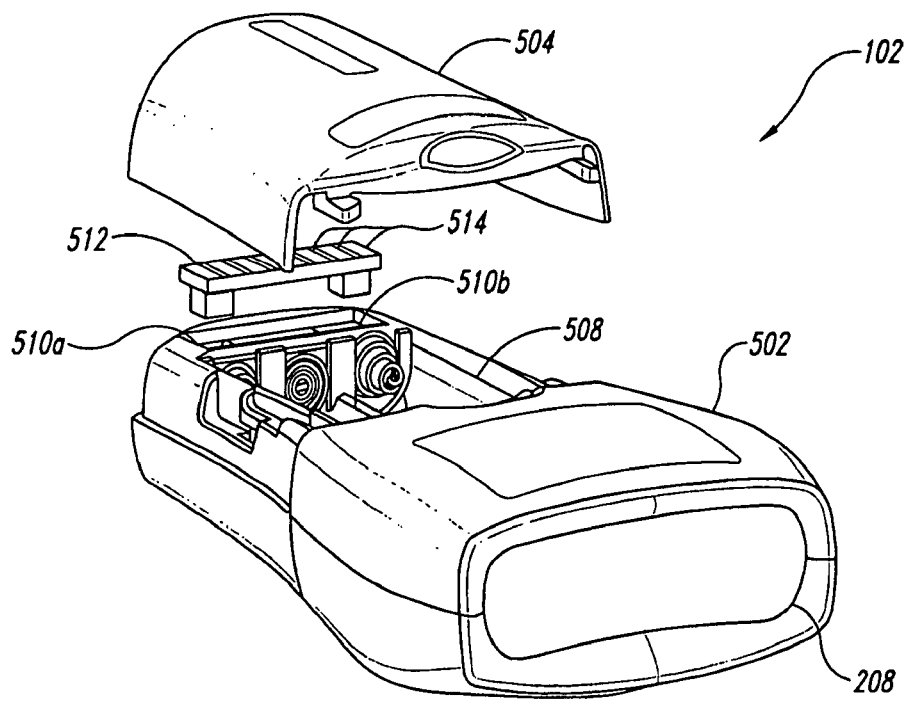
FIG. 5B is an isometric view of the bottom of a bar code scanner showing a removable battery door and an auxiliary interface connector into the battery compartment.

FIG. 5B is an isometric view of the bottom of a bar code scanner 102.

Body 502 includes a window 208 in its front surface. Battery door 504 is shown in an exploded position above battery compartment 508. Battery compartment 508 may receive AAA batteries for example. Auxiliary interface communication apertures 510a and 510bB are shown at the back of body 502. Apertures 510a and 510b, which may be left open for easy exposure to the circuit boards, are covered by battery door 504 when the door is in place. Auxiliary interface connector 512 may be inserted through auxiliary interface communication apertures 510a and 510b to couple to corresponding connectors on the printed circuit board inside. Auxiliary interface connector 512 may include a plurality of electrical contacts 514 on its top surface to facilitate communication with an auxiliary interface inside battery compartment 508 (auxiliary interface not shown). In some embodiments, auxiliary interface connector 512 may be deleted from the base scanner and be included on the bill-of-materials of an auxiliary interface accessory product. This has an advantage of reducing the cost of the base unit.

Figure 5C:
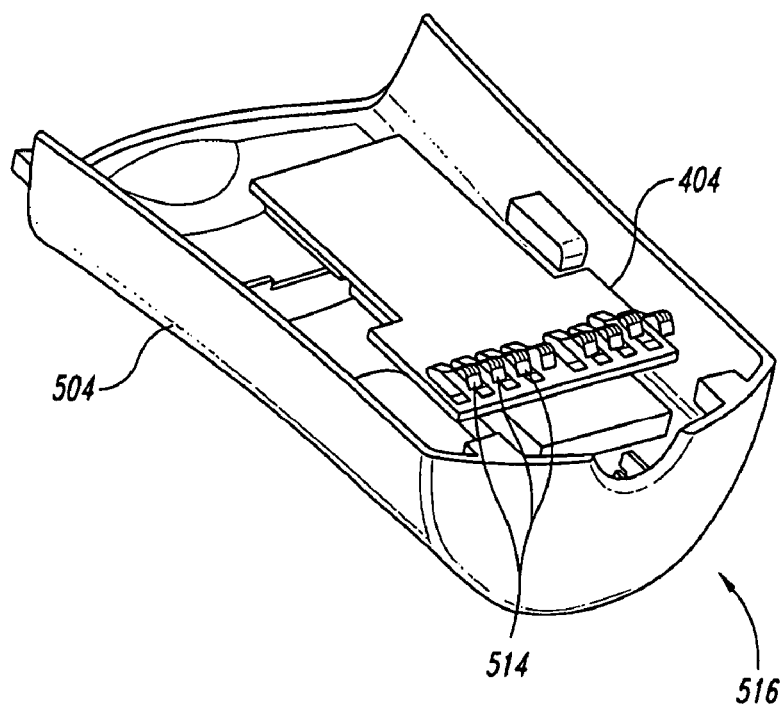
FIG. 5C is an isometric view of the battery door of a bar code scanner having an auxiliary interface module, such as a Bluetooth radio module, installed.

FIG. 5C shows the inside of battery door 504 with an auxiliary interface 404 installed. Auxiliary interface 404 has a plurality of spring contacts 514 for making physical contact with the pads 514 of interface connector 512 when the battery door is slid onto the scanner.

The placement of an auxiliary interface 404 in the battery door facilitates easy field installation and removal by the user. The user may purchase a scanner having no auxiliary interface, and then later purchase an auxiliary interface kit for installation on the existing scanner. An auxiliary interface kit may include, for example, the battery door of FIG. 5C having a radio module installed and an auxiliary interface connector 512 of FIG. 5B. Battery door 504 with auxiliary interface board 404 may be referred to as an auxiliary interface 516.

Several auxiliary interfaces may be offered for use with a base scanner product. The particular auxiliary interface depicted in FIG. 5C is a Bluetooth radio interface. Alternatively, other interfaces and/or auxiliary input/output modules may be offered including alternative wired interfaces, alternative radio interfaces, auxiliary memory, an auxiliary display, an auxiliary keypad, etc.

Figure 6:
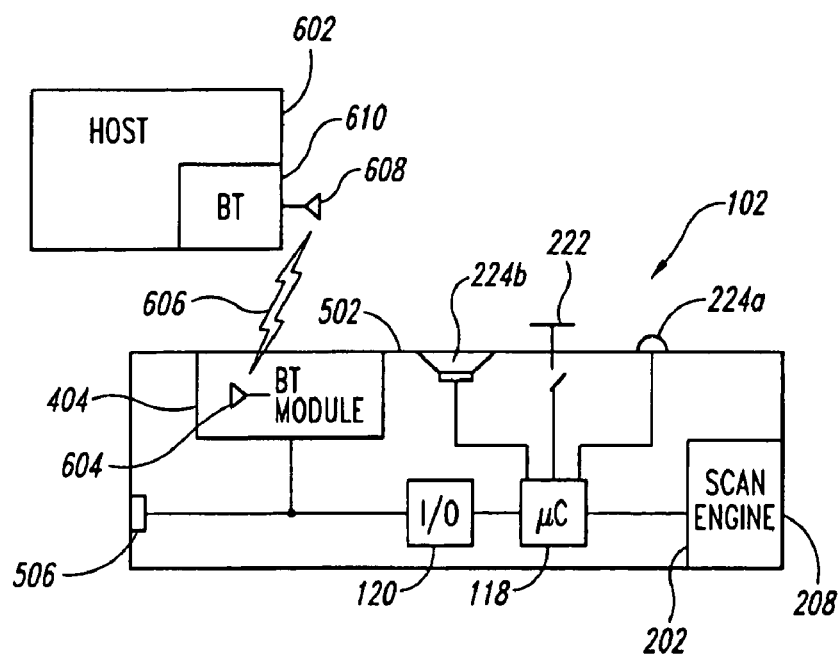
FIG. 6 is a block diagram of a system having a bar code scanner and host computer communicating via a Bluetooth auxiliary interface.

FIG. 6 is a block diagram showing a scanner 102 and host computer 602 in radio communication with one another.

Scanner 102 is packaged in a body 502 having a button 222 and an indicator LED 224a on its upper surface. The button and indicator are placed for easy access by user. Additionally, the scanner of FIG. 6 is equipped with a second indicator device, a beeper 224b. Button 222 and indicator 224 are in communication with the microcontroller 118. Microcontroller 118 in turn communicates with scan engine 202, which is optical communication with the field of view (not shown) via a scan window 208. Microcontroller 118 is further in communication with an interface 120. Interface 120 communicates with the external portion of body 502 via physical jack 506, which may for instance, comprise a stereo jack.

An auxiliary interface 404, which may for instance be a Bluetooth module having an antenna 604, may be permanently or removeably coupled to interface line 605. Bluetooth module 404 may be in communication with host computer 602 via radio waves 606. Radio waves 606 may be physically transmitted and received by scanner antenna 604 and host antenna 608. Host antenna 608 may be part of a host Bluetooth module 610. Host Bluetooth module 610 may be integrated into host 602 or alternatively may comprise an external adapter or dongle.

The scanner embodiment 102 of FIG. 6 may be uncoupled and used in a batch mode or may be temporarily, permanently, or semi-permanently coupled to an interface cable (not shown).

Figure 7:
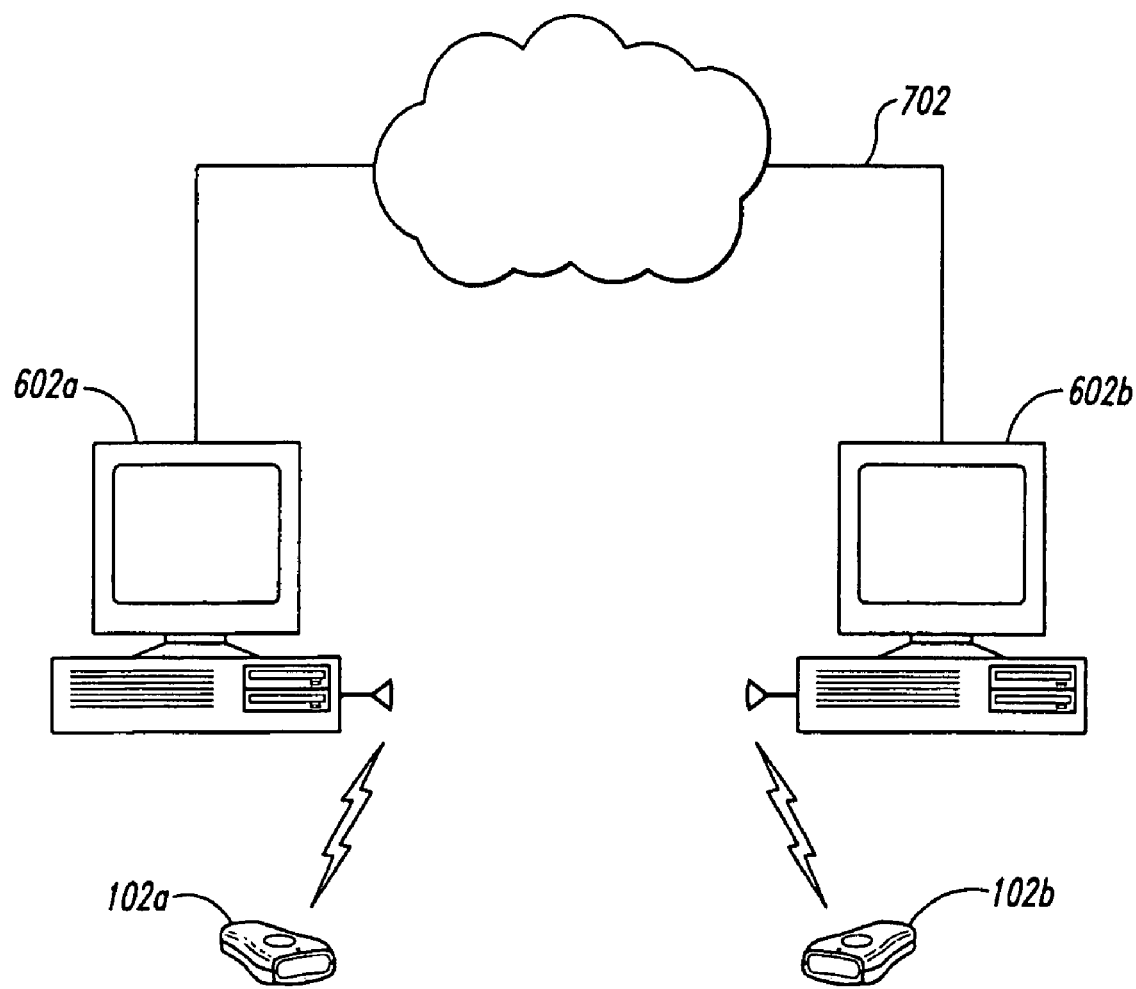
FIG. 7 is a block diagram of a system showing multiple end devices and multiple host computers in proximity to one another.

FIG. 7 is a block diagram showing an application having a plurality of scanners 102 in wireless communication with a plurality of host computers 602. In this example, scanner 102a is in communication with host computer 602a. Bar code scanner 102b is in communication with host computer 602b. Host computer 602a and 602b may in turn be in communication with a network 702. Network 702 may comprise a radio network, a local area network, a wide area network including the Internet, or other network.

In a system such as that of FIG. 7, it may be desirable for end devices 102 to send their data to their assigned host 602, and not have their data intercepted or improperly received by the wrong host. In the case of Bluetooth and other network standards, various conventions are used to ensure appropriate pairing between end devices 102 and individual hosts 602. Such pairings may comprise one-to-one, many-to-one, or one-to-many connectivity.

Bluetooth standards may use an assigned identification number, commonly called a PIN, to identify a particular pairing. In some applications, and particularly in applications where there is a chance of encountering another connection with the same PIN, it may be desirable to define a stronger pairing than a PIN-based pairing. For such applications, a longer and/or more specific pairing identifier may be desirable. One example of a stronger identifier is the host Bluetooth device number, commonly referred to as a BD number. Thus, for stronger pairing, the host and end device may use a strong identifier such as the host BD number.

While the host computers 602 shown in FIG. 7 are depicted as desktop computers, other types of host computing devices may be interchanged. For example, wireless PDAs may be used to provide mobile computing capabilities. The PDAs may serve as a host to the end devices 102, while themselves operating as clients to other remote hosts. In this sense, the term "host" is not necessarily limited to a computer that is itself performing computing, but rather refers to a relationship in the communication schema. In Bluetooth systems, a host 602 may be a "master" end of the link and an end device 102 a "slave" end of the link. In alternative architectures, the devices may be in the form of a peer-to-peer, client-server, or other logical relationship.

Figure 8:
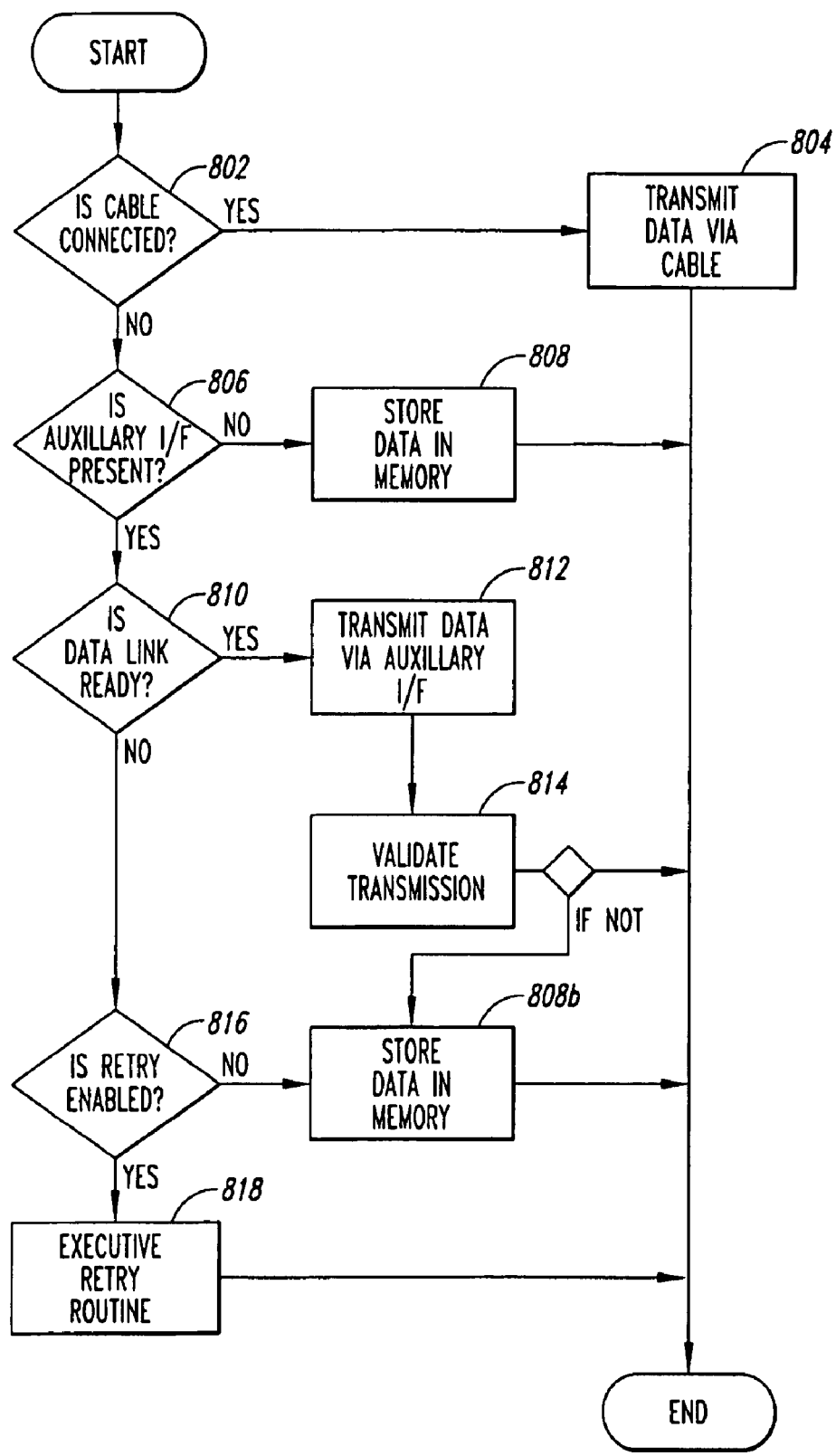
FIG. 8 is a flow chart showing logic for determining when to transmit data, when to store data, and how to choose an interface for data transmission.

FIG. 8 is a flowchart showing logic for selecting a communication mode in a device having a plurality of communication modes. In decision step 802, it is determined whether or not a cable is connected to the interface port. If the cable is connected, the routine proceeds to procedure 804 and data from the scanner is transmitted to the host via the cable. After executing data communication step 804, the program returns to other tasks.

If, in decision box 802 it is decided that a cable is not connected, the program proceeds to decision box 806. In decision box 806, it is determined whether or not an auxiliary interface is present. An exemplary auxiliary interface is one such as the end device module 404 shown in FIGS. 4, 5c, and 6. As discussed above, a Bluetooth radio module is one example of an auxiliary interface 404.

If decision box 806 determines that no auxiliary interface is present, the program proceeds to procedure 808 where the data is stored in memory. After executing step 808, the program returns to other tasks.

If decision box 806 determines that an auxiliary interface is present, the program proceeds to decision box 810. Decision box 810 determines whether a data link is ready to accept data communication. A data link may, for example, comprise a memory card that has capacity, a display that is turned on, a wireless interface that has a connection with the host, or other means for transmitting, storing, displaying, or otherwise processing data. Some interfaces such as radio interfaces may have power saving modes where the data link is not kept active when no data is being transmitted. Examples of power saving states will be discussed in conjunction with FIG. 9. For auxiliary interfaces having such power saving states, decision step 810 may involve the auxiliary interface powering up and testing or attempting to reestablish communication with the host.

If the data link is ready, the program proceeds to step 812 where the data is transmitted to the auxiliary interface. If the auxiliary interface is a link to a host computer, the auxiliary interface then transmits the data to the host computer. The program may then proceed to optional transmission validation procedure 814. As will be described elsewhere, several levels of transmission validation are available depending upon user or administrator preference. If the transmission is validated, the program returns to other tasks. If the transmission is not validated, a transmission validation sequence may be enabled. A transmission validation sequence may comprise one or more retries, an ACK/NAK algorithm, a message sequencing algorithm, and/or other processes. If, after executing transmission validation, it is found that the transmission cannot be validated, the program may proceed to step 808 where the message is stored in memory.

In some embodiments, step 808 may not involve actually storing data in memory, but rather not deleting data already stored in memory. In some implementations, the data may be saved in memory until a command is received to delete the data from memory. Such a command may, for example, be issued by the microcontroller after receipt of an ACK from the host, may be issued after an acknowledgement by the auxiliary interface, may be issued by the user as a command to delete the display, or may be issued upon other appropriate conditions. As an alternative to the deletion command being issued by the microcontroller, such a command may be issued by the auxiliary interface itself or by the host computer.

If it is determined in decision box 810 that the data link is not ready, the program proceeds to decision box 816. Decision box 816 determines whether the user has enabled a transmission retry. The transmission retry is not enabled, the program proceeds to process 808 and the data is stored in memory. After storing the data, the program returns to other tasks. If decision box 816 determines that retry is enabled, the program proceeds to procedure 818 in the retry routine is executed.

Figure 9:
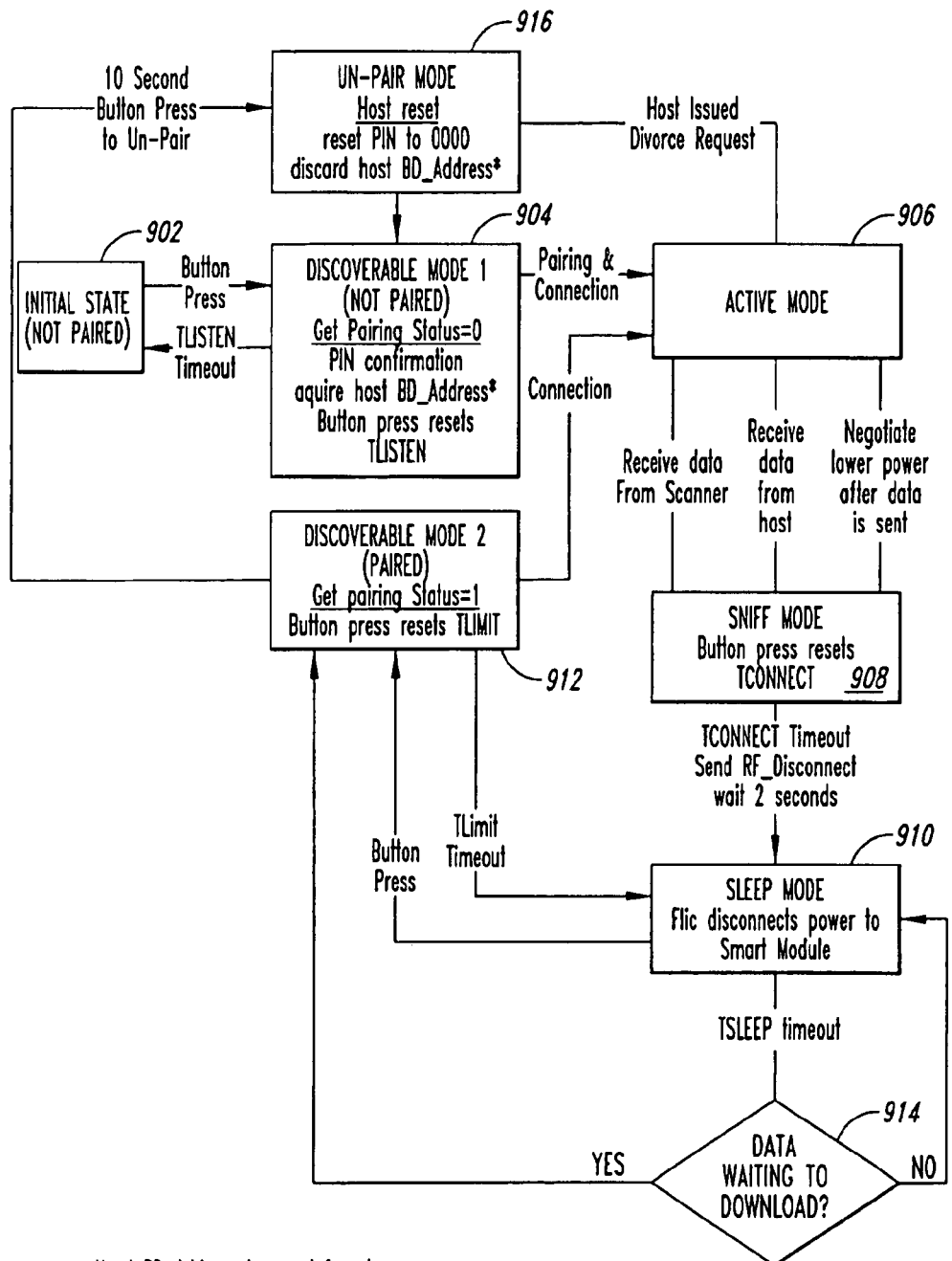
FIG. 9 is a flow diagram illustrating various operation modes for a remote Bluetooth module.

An example retry routine is described in conjunction with FIG. 9. As an alternative to separate decision steps 810 and 816 and procedure 181, retry may be enabled as part of a sequence executed elsewhere such as in optional transmission validation procedure 814.

The procedure of FIG. 8 ensures that a scanner will respond first to a physical connection made via its input port. This maintains such a physical connection as the highest priority connection. The physical connection may be used for a variety of purposes including programming the auxiliary interface. Alternatively, the user may change the default setting such that decision box 802 is executed at the end of the flow chart, resulting in the end device trying alternative interfaces prior to trying the wired interface. In another alternative, the cable connection may be disabled altogether and the unit forced to communicate via an auxiliary interface.

As described above, an auxiliary interface may comprise a real-time interface to a remote host, or alternatively may comprise and auxiliary memory, a display, voice synthesis, or other local auxiliary interface that does not immediately communicate with a host.

FIG. 9 is a flow diagram showing various operational states for an auxiliary interface comprising a Bluetooth radio. A similar flow diagram may be applied to other types of auxiliary interface. An INITIAL STATE 902 may exist in a new unit issued from the factory or when the unit has not been paired in DISCOVERABLE MODE 1 after predetermined period of time (including after an un-pair command has been issued).

DISCOVERABLE MODE 1 904 is the mode used when the unit has not been paired or when its pairing has been canceled. DISCOVERABLE MODE 1 may be entered from INITIAL STATE 902 by pressing the scan button 222. In DISCOVERABLE MODE 1, the Bluetooth radio 404 listens for an inquiry from a host computer. If the inquiry is not heard for a period of time $T_{listen}$, the radio returns to INITIAL STATE 902. In some embodiments, the default time for $T_{listen}$ may be five minutes, for example. If the radio receives a host inquiry while in DISCOVERABLE MODE 1, it may pair with that host.

The link may be identified by a PIN issued by the host. A PIN may be used for standard strength pairing. For some applications, it may be preferable to have a stronger pairing between host and end device. For example, in environments with many active links, the standard strength pairing offered by PIN-based identification may be susceptible to interception or mis-pairing. This may be ameliorated by use of a more unique pairing identifier such as a very long PIN or a hardware-specific identifier. Thus, as an alternative or addition to standard strength pairing, the end device may receive the host Bluetooth Device address, or BD address, which may be used to ensure stronger pairing with a given host. Alternatively, the end device BD address, some other specific hardware identifier, or a user-assigned long PIN may be used to strongly identify the link.

After making connection with a host in DISCOVERABLE MODE 1 904 the program moves to ACTIVE MODE 906 with the host. During ACTIVE MODE, data may be transmitted to and received from the host. After data is sent and received in ACTIVE MODE 906, the Bluetooth module negotiates lower power with the host and moves to SNIFF MODE 908. During SNIFF MODE, which conserves battery power, a minimal ping rate is maintained to ensure a continuous data link. If additional data is received from the scanner, the Bluetooth module moves from SNIFF MODE 908 back to ACTIVE MODE 906, and transmits the data. The Bluetooth module may also move from SNIFF MODE 908 to ACTIVE MODE 906 if the host indicates it has data to transmit to the scanner. After the data is received or transmitted, lower power is again negotiated with the host and the unit moves back into SNIFF MODE 908.

To further conserve battery power, the Bluetooth module may be set to move from SNIFF MODE 908 to SLEEP MODE 910 after a period of time $T_{connect}$. In some embodiments, the default period for $T_{connect}$ is five minutes, a value that may be changed by the user or an administrator. In SLEEP MODE 910 the electronic device (e.g. scanner, PDA, imager, telephone, etc.) disconnects power to the Bluetooth module. In SLEEP MODE, the data link to the host is lost, and must therefore be re-established to enable communication. Pressing the button on the scanner causes the program to proceed from SLEEP MODE 910 to DISCOVERABLE MODE 2 912. In DISCOVERABLE MODE 2, the Bluetooth module listens for a host inquiry. Because it has been associated or paired with a particular host, the Bluetooth module listens for an inquiry only from that particular host, ignoring inquiries from other possible hosts. If an inquiry is received from the paired host while in DISCOVERABLE MODE 2 912, a connection is made and the system reenters ACTIVE MODE 906, transmits data received from the scanner, negotiates lower power with a host and moves back into SNIFF MODE 908. The program then either reenters SLEEP MODE 910 after a period $T_{connect}$ or reenters ACTIVE MODE 906 if more data is received from the scanner or the host attempts to send data.

The period that the Bluetooth unit will remain in DISCOVERABLE MODE 2 912 while not receiving a ping from its paired host is referred to as $T_{limit}$. In some embodiments, the default value for $T_{limit}$ is one minute, although $T_{limit}$ may be changed by the user or an administrator.

A retry routine may be enabled for the case when the scanner holds data to be transmitted but the data link to its host computer cannot be established. A period $T_{sleep}$ may be set to retry data transmission. If $T_{sleep}$ is set to 0, retry mode is disabled and the Bluetooth module will not attempt to reconnect with a host until another button press is received from the scanner. If $T_{sleep}$ is set to another value, the scanner will look for data to be sent and, if appropriate, wake the Bluetooth module to attempt reestablishing a data link. This procedure is shown as decision box 914 and associated arrow. After $T_{sleep}$, the program enters decision box 914 where the microcontroller examines whether or not there is data waiting to be sent to the host computer. If there is not data waiting to be sent to host computer, $T_{sleep}$ is reset and the Bluetooth module is not awakened. If decision box 914 determines that there is data waiting to be sent to the host computer, the Bluetooth module is awakened and the program reenters DISCOVERABLE MODE 2 912 and attempts to make a pairing with its host.

In some applications, the default time for $T_{sleep}$ is 60 minutes. Thus, while the scanner holds data intended for the host, the Bluetooth module will wake up every 60 minutes, reenter DISCOVERABLE MODE 2, and attempt to make connection with its host computer.

Operation of the Bluetooth interface may be optimized for various use environments by adjusting the parameters $T_{listen}$, $T_{connect}$, $T_{sleep}$, and $T_{limit}$. These parameters, their default values, and some modified values for exemplary environments are given in the table below:

| Parameter | $T_{listen}$ | $T_{connect}$ | $T_{sleep}$ | $T_{limit}$ |
| --- | --- | --- | --- | --- |
| Definition | Period waiting to be discovered by any host in DISCOVERABLE MODE 1 | Period staying in SNIFF MODE before going to sleep | Interval between entering SLEEP MODE and attempting to reconnect (if data) | Period waiting to be discovered by paired host in DISCOVERABLE MODE 2 |
| Default Value | 5 minutes | 5 minutes | 60 minutes | 1 minute |
| PDA Host | | | 0 | 0.2 minute |
| Warehouse/ Desktop Host | | | 2 minutes | 0.5 minute |
| Supermarket | 0 | | 240 minutes | |

The default values provide reasonably good performance for a wide variety of use environments. As discussed below, longer or shorter periods may be appropriate depending upon the configuration and environment. For example, longer periods for $T_{connect}$ and $T_{limit}$ may yield better responsiveness in exchange for decreased battery life.

Alternatively, different timer values may be appropriate for various application environments. For example, a PDA may be used as a portable host for the end device 102. In that case, it may be assumed that the PDA and end device are always within radio range of one another. Thus, if a connection is dropped, it may not be because the end device has wandered out of range, but rather because the PDA went into its sleep mode to conserve battery power. In this case, it would be inadvisable for the end device to automatically wake periodically and attempt to reconnect. Similarly, it may be expected that the radio link, when up, is relatively strong and therefore it should not take very long to be discovered by the PDA in DISCOVERABLE MODE 2. Thus, as may be seen from the table, it may be appropriate to set $T_{sleep}$ to 0 (causing no automatic attempts at reconnection) and to set $T_{limit}$ to a low value such as 0.2 minute. To attempt to reconnect with these settings, the user would wake the PDA, start the PDA Bluetooth search routine, and push the button on the end device. Any unsent data would then be sent to the PDA after the manual reconnection. In some applications, the PDA Bluetooth link may be set to automatically attempt to link on start-up so the user would simply wake the PDA and push the button on the end device.

For other applications it may be preferable to use other timer values. For example, in a warehouse environment with a host computer that is not programmed to go to sleep, it may be preferable to set $T_{sleep}$ to a relatively short interval, such as 2 minutes, and set $T_{limit}$ to a correspondingly short time such as 0.5 minute. Such settings would anticipate the end device being moved in and out of radio range, while providing reasonably timely transmissions of data that had been collected while out of range, owing to the short sleep periods.

For an application requiring rapid response, such as a grocery checkout counter for example, it may be advantageous to keep the end device in SNIFF MODE for long periods, even during inactivity. Because the latency in moving from SNIFF MODE to ACTIVE MODE is very short compared to the latency of moving first to DISCOVERABLE MODE 2 and then into ACTIVE MODE, such a setting could help ensure immediate availability for processing customer transactions. An example of such a setting would be to set $T_{connect}$ to a long duration such as 240 minutes.

The examples above show a conceptual framework for setting the timer settings for variations on these applications and other applications.

The scanner and its Bluetooth module may be un-paired from its host by a long button press. For example, if the user presses the button 222 for 10 seconds or more, the scanner interprets that as a command to un-pair. After receiving the un-pair command the program enters un-pair mode 916, where the host identification is reset. In the case of standard strength pairing, the PIN is reset to 0000. In the case of strong pairing, the host BD address may be discarded.

A list of multiple eligible hosts may be maintained in the end device. When multiple hosts are listed, the end device may pair with any one of such eligible hosts that sends an inquiry while the end device is in DISCOVERABLE MODE 2. Such a list of multiple eligible hosts allows a roaming end device to establish successive pairings as it moves through the radio ranges of the multiple hosts. While operating in a point-to-point mode at any one time, such a schema provides the user with functionality akin to a multi-point network architecture.

For facilities where pairing with any host is an acceptable host, the end device may include wildcard characters in its list of eligible hosts. Alternatively, the device may be set to always return to DISCOVERABLE MODE 1 after breaking contact with a particular host.

During movement between the states of FIG. 9, the indicator 224 may show the various states to the user. In discoverable modes 904 and 912, the LED gives two short blanks every two seconds. When the scanner is connected and in range, as in sniff mode 908, the LED gives one short blink every two seconds. This arrangement of only a single blink when in sniff mode 908 helps to conserve power, since this mode may be entered more often than are discoverable mode 904 and 912. When data is being transmitted or received, and unit is in active mode 906, the (LED) indicator 224 blinks at 2 hertz.

Additionally, the indicator 224 may be set to indicate when a portable data carrier has been decoded properly, and/or when the host application has received and acknowledged the decoded data. Additionally, error conditions, such as an improper data type being scanned may be flagged to the user by issuing error blinks, beeps or other indications.

The end device Bluetooth module 404 may be initially paired with a host computer by entering DISCOVERABLE MODE 1 904, receiving a radio query from and pairing to the host as described above, or alternatively may receive host pairing information via a wired interface such as interface 120 (and physical connection 506). Wireless pairing may be accomplished by the user momentarily pressing the button on the scanner in the vicinity of the computer with which he wants to pair. The momentary button press acts as a command to move from INITIAL STATE 902 to DISCOVERABLE MODE 1 904. If the end device had previously been paired with a different host computer, an alternative input may be used to issue an un-pair command, moving the program from DISCOVERABLE MODE 2 912 to UN-PAIR MODE 916, and from there to DISCOVERABLE MODE 1 904. In some embodiments such an alternative input may comprise a longer duration button press (acting as a "one-click" disconnect), a double button press, the scanning of a disconnect-from-host symbol, or other input means available at the end device. In some preferred embodiments according to the invention, a button press of approximately ten seconds duration comprises the command to un-pair.

Upon receiving a local un-pair command, the LED and beeper, which together may comprise indicator 224, may give feedback to the user that the un-pair command has been received and/or executed. In some applications, the administrator may wish to disable the local un-pair and/or local pair commands. For those applications, the end device can issue a different response, indicating the command was not executed. For example, a brisk double beep and concurrent double LED blink may indicate pairing has been accomplished. A high-low beep and brief flashing LED blink may indicate un-pairing. A triple beep and triple LED blink may indicate the command was not executed.

For cases where the administrator wishes to have more control over pairing and un-pairing, for cases having multiple Bluetooth hosts potentially querying for end devices within radio range, and for other cases, it may be preferable to establish pairing and/or un-pairing via a non-radio link. For such cases, the scanner and Bluetooth module may receive host information over a cable connection. Receiving host information over cable connection can help prevent the possibility of pairing with the wrong host when several hosts are present in the environment.

In alternative embodiments, the scanner may be placed in a shielded area, such as a Faraday cage for example, in communication with its desired host computer, thus preventing pairing with unwanted hosts.

Various integrity levels are available for ensuring data transfer to the host computer. Level 1 implements no data integrity and therefore the connection is not guaranteed. Level 2 uses an application level ACK/NAK between the scanner and an application to guarantee no data is lost. Under Level 2 integrity, it is possible that a data transmission could be duplicated. This can happen if the radio connection goes down after the host receives the transmission and before the end device receives an ACK. In this case, the end device will attempt to resend the data to the host when the radio connection is resumed, resulting in duplicate data at the host.

Level 3 uses the application level ACK/NAK and packet serialization to guarantee the data will be neither duplicated nor lost.

Figure 10:
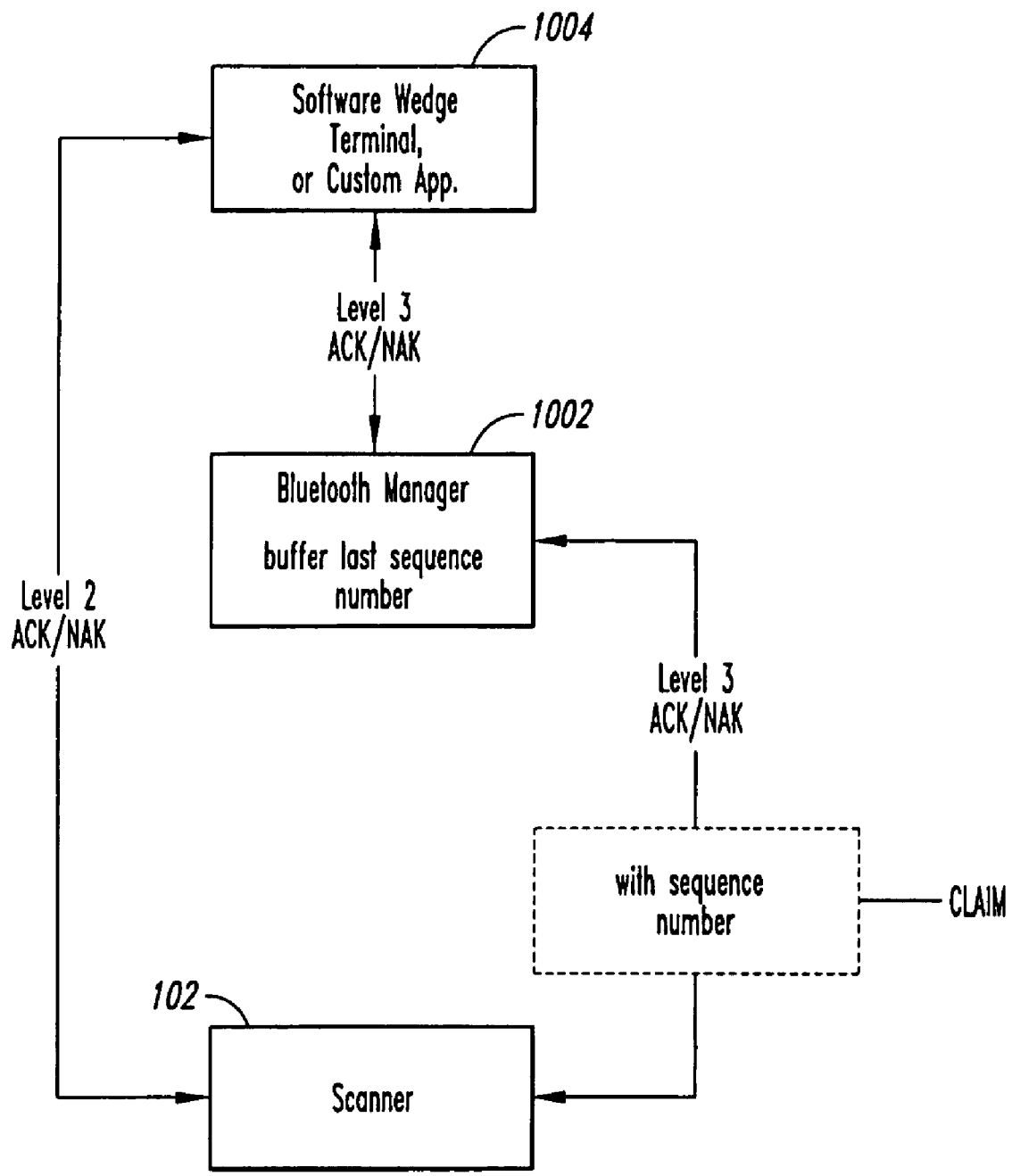
FIG. 10 is a flow diagram illustrating interrelationships between an end device and host software.

FIG. 10 is a flow diagram illustrating the relationship between the end device 102 with Bluetooth interface 404, an optional host-based Bluetooth manager program 1002, and a host application 1004. The host application 1004 may, for example, be a software wedge program or custom application. As described above, Level 1 uses no data integrity means and therefore does not guarantee transmission between the end device 102 and the Bluetooth manager 1002 or the host application 1004.

Level 2 uses an ACK/NAK protocol between the scanner 102 and host application 1004. Level 2 may be convenient, for example, when a hardware dongle is used in the host computer and host application is set up to communicate via (what it thinks is) a serial port. In this case the application sets its port to ACK/NAK protocol and receives data in the normal way, as if the scanner were cabled to the computer.

Under ACK/NAK protocol, the scanner 102 waits for a response from the host application prior to taking action with the data being transmitted. For example if the end device 102 receives an ACK, it means that the host application has received the data. The data is erased from end device memory after receiving an ACK. If, on the other hand, the scanner receives a NAK, it recognizes that the host application has not received the data and the data is retained in memory until a successful transmission occurs. If the end device 102 receives no response from the host, it treats the event as a NAK and attempts to resend a predetermined number of times. In addition, the Bluetooth interface 404 goes through its reconnection and/or retry routine.

When data integrity level 3 is selected, the system uses both an ACK/NAK protocol and a transmission sequence protocol. The scanner 102 transmits its data (via the Bluetooth radios in the end device and host) to the Bluetooth manager 1002 with an attached sequence number. The Bluetooth manager 1002 compares the received sequence number with the previously received sequence number. If the sequence number does not match the previous sequence number, the Bluetooth manager sends the data to the application 1004. The Bluetooth manager then replaces the previous sequence number with the new sequence number and repeats the process for the next received message.

Alternatively, the Bluetooth manager 1002 can buffer a plurality of received sequence numbers and search its buffer for a duplicate number. If the sequence number does not match a previously received number in the Bluetooth manager 1002 buffer, the Bluetooth manager sends the data to the application 1004.

The application, upon receiving the message responds with an ACK or NAK, according to its ability to receive data. If able to receive data, the application software 1004 sends an ACK to the Bluetooth manager 1002, and the Bluetooth manager 1002 relays the ACK back to the end device 102. If the application software 1004 is not able to receive the data present, it sends a NAK Bluetooth manager 1002, which in turn relays the NAK back to the end device 102. In various embodiments, the Bluetooth manager 1002 may then keep the original previous sequence number, delete the transmission sequence number that it had placed in its buffer, or set a flag to indicate the transmission sequence number is still valid. Following receipt of the NAK, the end device attempts to resend the data and the procedure is repeated.

In some embodiments, the Bluetooth manager 1002 may act as a virtual end device, always responding to the real end device with an ACK when it has received the data and then attempting to pass the data on to the host application 1004, acting as a proxy for the end device during transmission, retries, etc.

If, when the Bluetooth manager 1002 searches its buffer for a duplicate number, a duplicate number is found, the Bluetooth manager 1002 sends an ACK to the scanner 102 and deletes the message. Rather than a duplicate message being sent to the host application, the Bluetooth manager 1002 has recognized the message as duplicate and deleted it. Thus, in data integrity level 3, the end device 102 simply appends a sequence number and attempts to resend the data until it receives an ACK from the host. Because each message is permanently assigned its own sequence number, the Bluetooth manager 1002 will not allow a particular message to be transmitted to and received by the host application twice.

Figure 11:
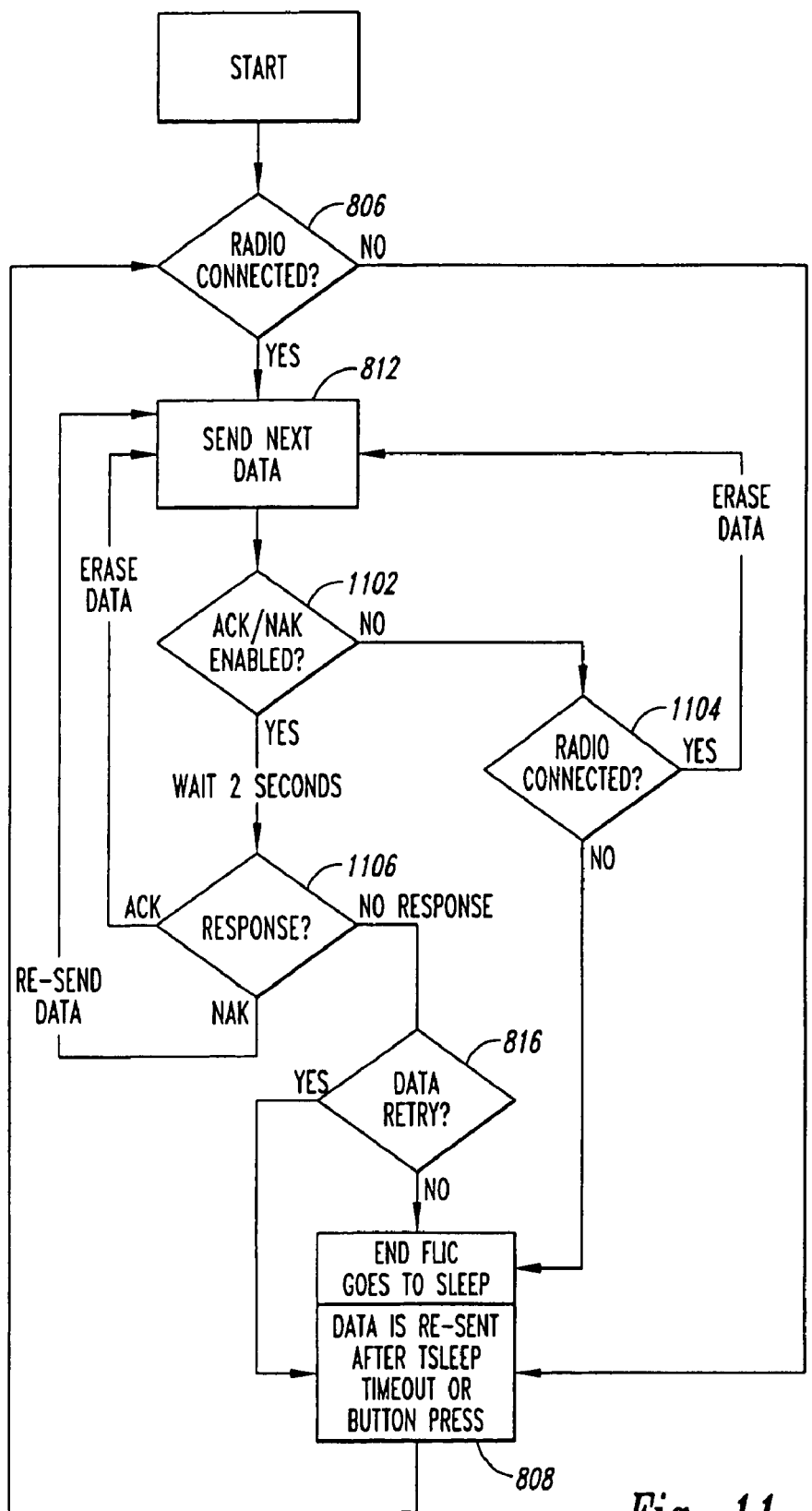
FIG. 11 is a flow chart showing logic for transmitting data using an ACK/NAK protocol over a wireless data link.

FIG. 11 illustrates an end device algorithm for Level 2 data integrity. After a data collection engine reads a portable data device, and data is decoded (for example after a bar code scan engine scans a bar code symbol and the symbol is decoded), the process enters decision box 806 to determine if the radio is connected. If the radio is not connected, the data is retained memory as shown in step 808. If decision box 806 determines that the radio is connected, the data is transmitted to the host via the radio in procedure 812. After sending the data the program proceeds to decision box 1102, which determines if either level 1 data integrity or level 2 data integrity is enabled, i.e. whether or not ACK/NAK protocol is enabled. If ACK/NAK is not enabled, the program goes to decision box 1004 to determine if the radio is still connected at completion of the transmission. If the radio is still connected, it is assume the data was received. The data is erased from memory and the program proceeds back to procedure box 812 in preparation for the next data. If the radio is not connected at the end of transmission as determine by decision box 1104, the scanner assumes that the link was lost prior to or during transmission and that the data did not reach the host computer. In this case the program proceeds to procedure 808, retaining the data in memory and going to sleep.

If in decision box 1102 ACK/NAK is determined to be enabled, the end device waits for brief period (two seconds for example) and then proceeds to decision box 1106 and determines if it has received a response from the host. If the end device receives an ACK, signifying receipt of the data by the host application, the data is erased from memory and the program proceeds back to procedure 812. If in decision box 1106 it is determined that a NAK was received from the host computer, indicating that the host application did not received the data, the program proceeds directly back to the Send Next Data box 812 without erasing the data. The "next data" in that case is the message that received a NAK, which is subsequently resent and the procedure repeated.

If at decision box 1106 it is determined that there was no response from the host computer, the scanner keeps the data in memory and goes to sleep as indicated by the procedure 808.

The procedure of FIG. 11 may be repeated until all data in the buffer has been sent. After all data has been sent and there is no additional activity requiring processing, the system may go to an idle state and thereafter go to sleep. Receipt of another button press moves the system from idle or sleep to the start, and the procedure is repeated.

Figure 12:
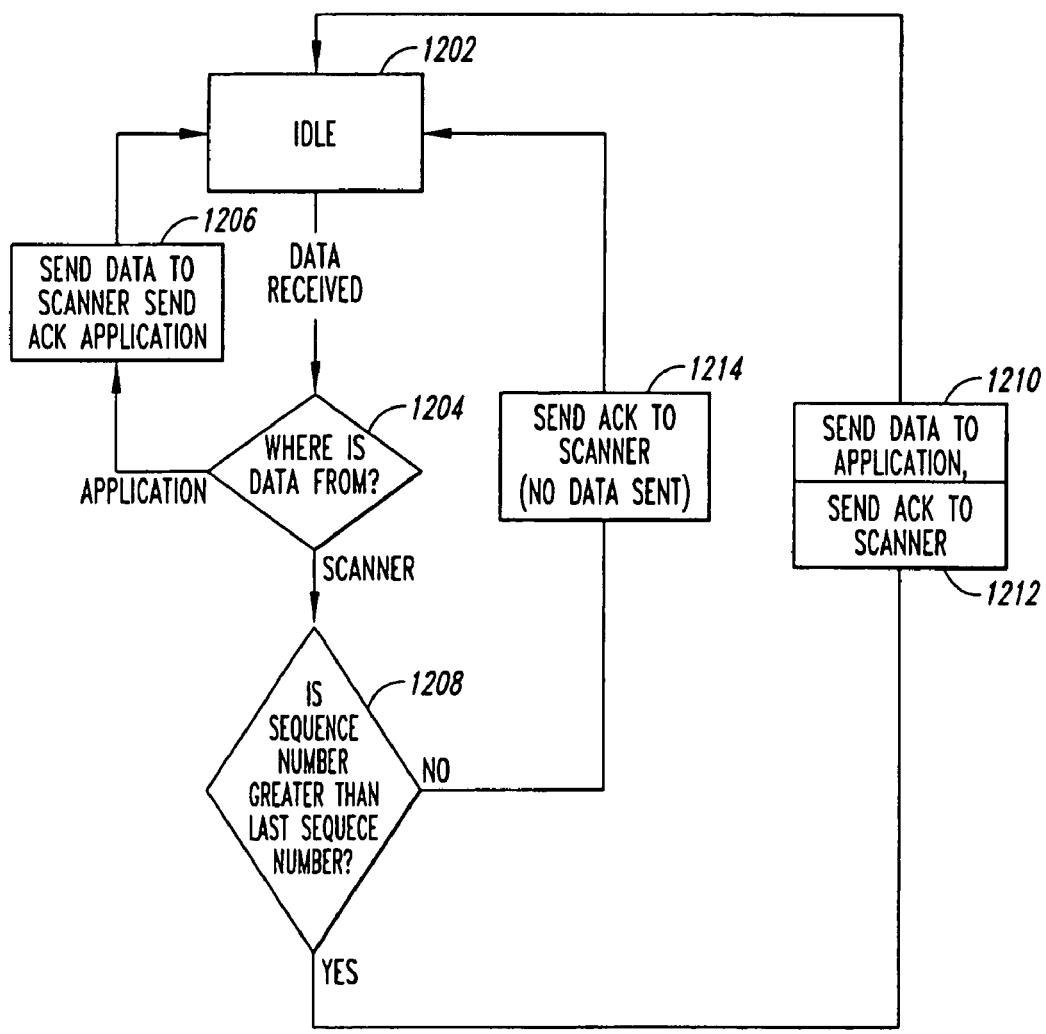
FIG. 12 is a flow chart illustrating operation of a host-based Bluetooth manager.

FIG. 12 is a flowchart indicating the logic flow of Bluetooth manager 1002. Bluetooth manager 1002 starts in idle mode 1202, generally remaining there until data is received. When data is received, the program proceeds to decision box 1204 where determines where the data is from. If the data is from the host application, Bluetooth manager sends the received data to the end device, as shown in procedure 1206, receives an acknowledgement from the end device, sends an ACK to the application, and returns to idle mode 1202. The ACK sent to the application may be a literal relay of an ACK received from the end device or may be generated based on another acknowledgement event such as a low level handshake, for example.

If in decision box 1204 the data is determined to have been received from the end device, the Bluetooth manager examines the transmission sequence number attached to the message and determines whether or not it is different than the last sequence number. This is shown in decision box 1208. If the sequence number is greater than the last sequence number. The Bluetooth Manager sends the data to the application and, upon receipt of an ACK from the application, sends an ACK back to the end device, as shown in procedures 1210 and 1212, respectively. After executing procedures 1210 and 1212, the Bluetooth Manager returns to Idle State 1202.

Additionally, the end device, auxiliary interface, or other device may packetize the information with a header or other flag that identifies the source and/or nature of the payload. The Bluetooth Manager may then route information in a context-sensitive manner. For example, when a packet is received indicating it is a transmission from the end device auxiliary interface to the associated host interface, the Bluetooth Manager may delete the message (knowing it has already been received by the lower level device) or route it to a device manager. Alternatively, when the header indicates the message contains configuration or other information related to the end device (but not related to application data), the Bluetooth Manger may route the information to an end device configuration manager or may use the information internally as appropriate. In another example, a packet header indicating bar code or RFID data may be routed to an application layer for further processing. ACK/NAK and/or transmission sequence protocols may be enabled and applied or not enabled according to individual application requirements. For example, application data transmissions may be selected to operate with level 3 data integrity while end device management transmissions operate with level 2 protocol. Thus, the contents of the packet can be used to select between protocols.

If in decision box 1208 it is determined that the sequence number is not greater than the last sequence number, indicating that it is a duplicate transmission, the Bluetooth manager sends an ACK to the scanner, as shown by the procedure 1214, but does not send the data to the host application. After executing step 1214, the program returns to idle state 1202.

Figure 13:
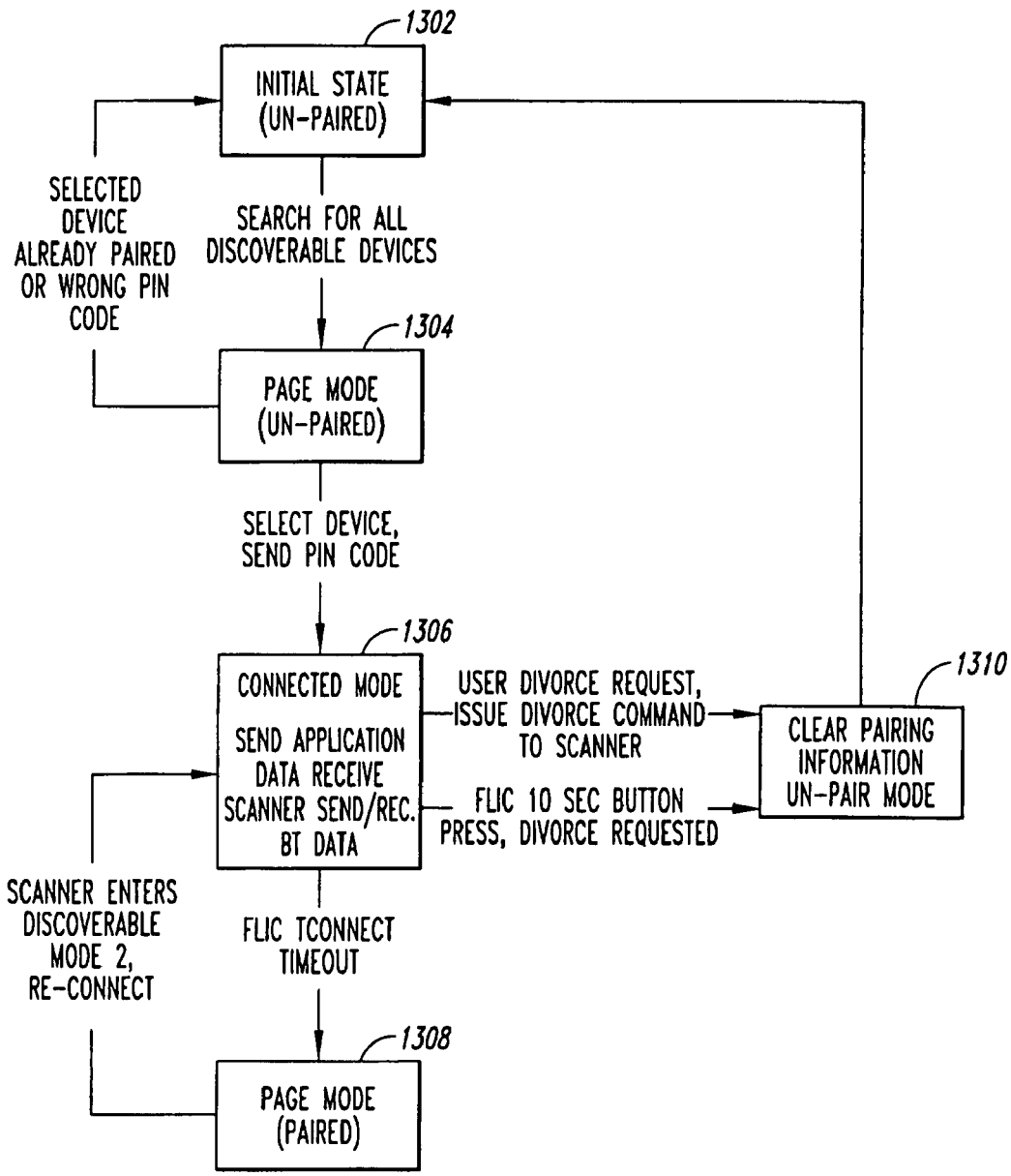
FIG. 13 is a flow diagram illustrating various states for a host system.

FIG. 13 is a flow diagram showing states of the host software that occur while the procedure of the flow diagram of FIG. 9 is being executed by the end device. Initially, the system is un-paired, as shown by initial state 1302. Upon receiving a command to search for Bluetooth clients, or upon boot-up if so enabled, the host computer enters UN-PAIRED PAGE MODE 1304. In UN-PAIRED PAGE MODE 1304, the host computer issues pings and listens for a response from a Bluetooth client. If the host makes contact with a Bluetooth client that has already been paired or has the wrong pairing code, the host software returns to initial state 1302. After that point the scanner may automatically reenter UN-PAIRED PAGE MODE 1304 or may alternatively disable its Bluetooth driver. When in UN-PAIRED PAGE MODE 1304 the host computer makes contact with a device that is not paired and does not have the wrong code, it sends a PIN code (or BD number if so enabled) to the device, and enters CONNECTED MODE 1306. In CONNECTED MODE 1306, which corresponds to end device modes 906 and 908, the host may send and receive application data to and from the end device and the host application.

If the host loses connection with the Bluetooth client, it enters PAIRED PAGE MODE 1308. The connection may be lost for a variety of reasons including the end device timing out and entering sleep mode or the end device roaming out of radio range. By moving directly into PAIRED PAGE MODE 1308, the host remains ready to reattach to the end device when the end device moves back into range or when the end device captures new data and attempts to reconnect. In those cases, the scanner reenters DISCOVERABLE MODE 2, which allows it to reconnect to the host. The host then moves back into CONNECTED MODE 1306, again able to transmit and receive data to and from the host and end device.

If the user issues an un-pair command to the scanner, for example by pressing the button for 10 seconds, and the scanner enters UN-PAIR MODE 916 of FIG. 9, an un-pair request is received from the end device. When an un-pair request is received, the host software enters UN-PAIR MODE 1310. UN-PAIR MODE 1310 clears pairing information from the host and puts the host back in its INITIAL STATE 1302. Alternatively, if the user issues an un-pair command at the host, the software issues an un-pair command to the end device, moving from CONNECTED MODE 1306 to UN-PAIR MODE 1310, where the un-pair procedure is executed.

Figure 14:
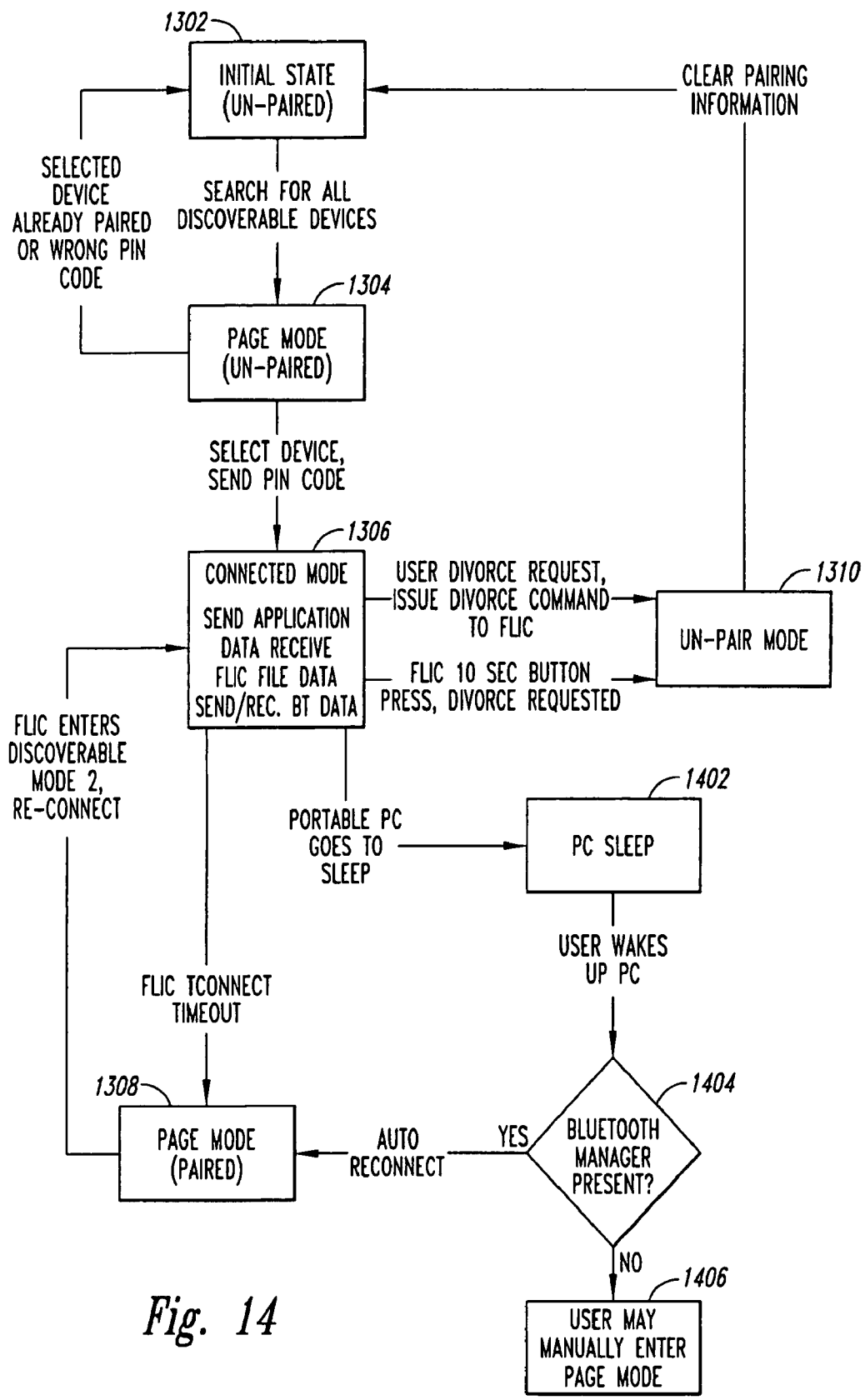
FIG. 14 is a flow diagram illustrating various states for a host system that may go to sleep at intervals.

If the host is set to go to sleep after a period of idleness, it may execute the host program with modes according to FIG. 14. INITIAL STATE 1302, UNPAIRED PAGE MODE 1304, CONNECTED MODE 1306, PAIRED PAGE MODE 1308, and UN-PAIR MODE 1310 are executed as per the procedure of FIG. 13 as long as the host computer remains awake. If the host goes to sleep while in CONNECTED MODE 1306 it enters SLEEP STATE 1402. When the host is awakened by the user or by another program, the host enters decision box 1404 and determines if the Bluetooth Manager is present. If the Bluetooth Manager is not present, the user may manually issue a command to move the computer from its INITIAL STATE 1302 to UNPAIRED PAGE MODE 1304 or PAIRED PAGE MODE 1308, as shown in procedure 1406. If during decision procedure 1404 is determined that the Bluetooth Manager is present, then the computer automatically attempts to reconnect to its paired end device by entering PAIRED PAGE MODE 1308 and executing the program as indicated earlier. The Bluetooth Manager, may thereby eliminate the need for manual re-pairing of the system after exiting SLEEP STATE 1402.

Figure 15:
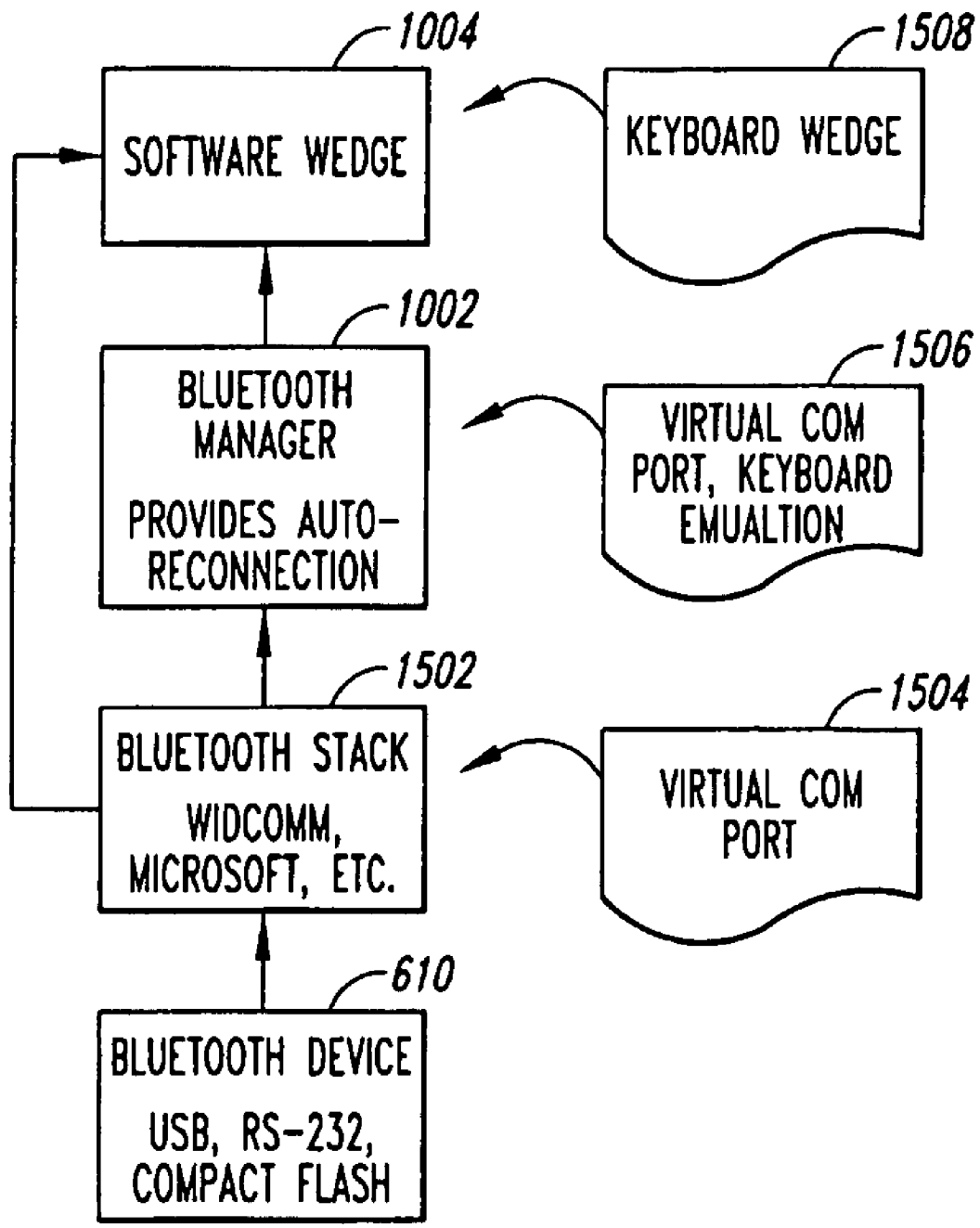
FIG. 15 is a block diagram illustrating interrelationships between various levels of host software.

FIG. 15 is a block diagram that illustrates the interrelationships among various levels of host hardware and software. The Bluetooth device 610 occupies the lowest level. The Bluetooth Stack 1502 is generally embedded in the Bluetooth device 610 and handles the low-level Bluetooth-specific protocol. The Bluetooth Stack 1502 comprises a virtual communications port, illustrated as box 1504. The optional Bluetooth Manager 1002 occupies the space above the Bluetooth Stack 1502 and may provide a number of functions including automatic re-connection, message sequence management, and others. The Bluetooth manager 1002 may act as a virtual communication port or as keyboard emulation, as shown by block 1506. The optional software wedge 1004 acts as a virtual keyboard as shown by block 1508. The software wedge 1004 may alternatively interface with Bluetooth Manager 1002 or directly with Bluetooth Stack 1502 when the Bluetooth Stack acts as a virtual communications port. The software wedge 1004 acts to turn received data into keystrokes for entering data into high-level applications such as databases, spreadsheets, etc. Software wedge 1004 thus provides a convenient way for a user to set up and use a data collection device such as a bar code scanner with existing high-level applications software. The Bluetooth manager 1002, in addition to providing automatically connection as shown in FIG. 14, may also be used to implement Level 3 data integrity, tracking transmission sequence numbers to ensure no redundant data is received by software wedge 1004 and thereby erroneously entered into the high-level host software (not shown). As an alternative to software wedge 1004, Bluetooth manager 1002 may communicate directly with custom host software or other software appropriately enabled to communicate with it.

Figure 16:
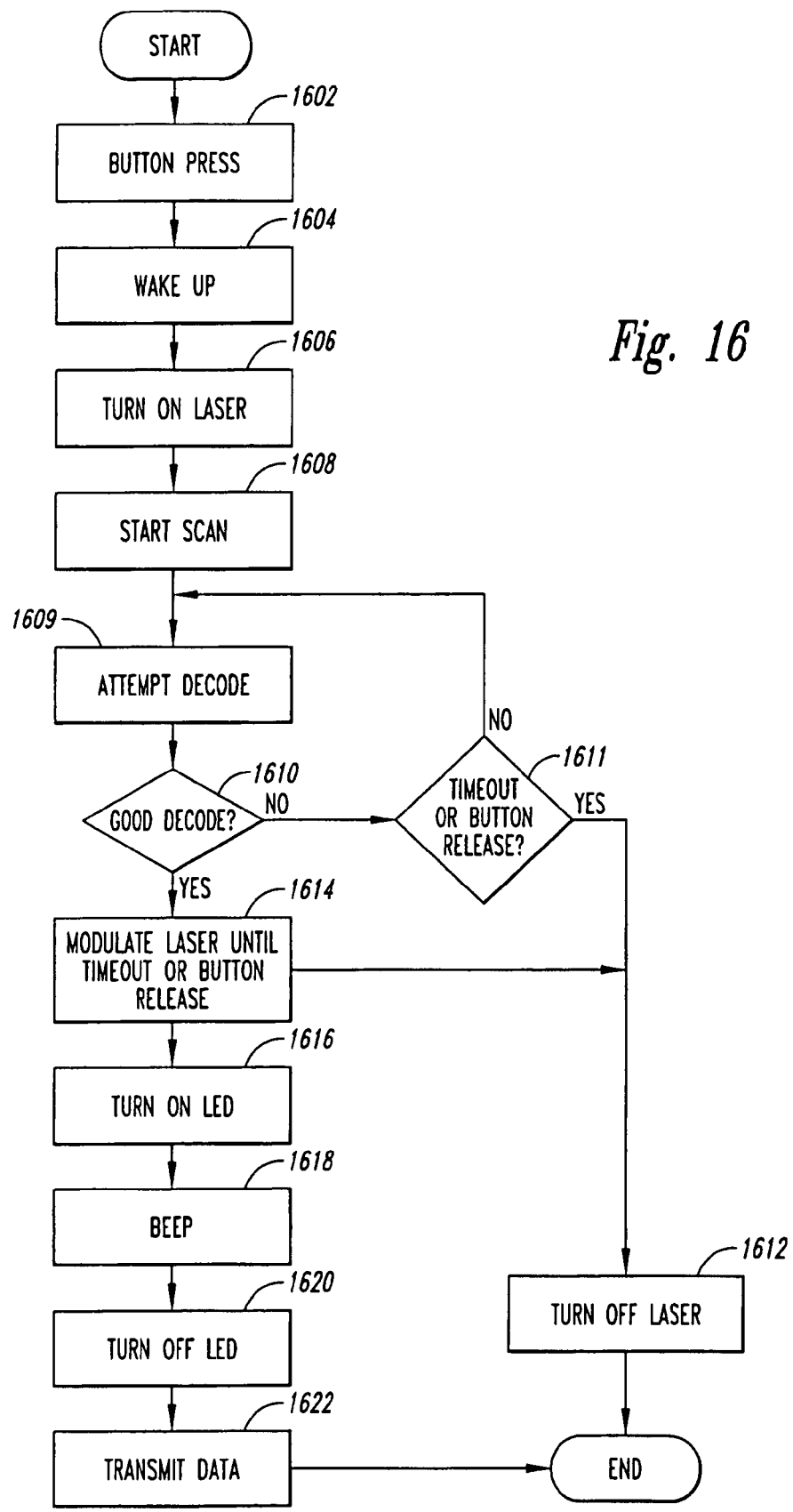
FIG. 16 is a flow chart illustrating the program progression of a bar code scanner.

FIG. 16 is a flow chart showing the operation of and end device embodied as a bar code scanner. A button press 1602 initiates system wake-up procedure 1604. By keeping the system normally asleep, power savings may be realized. If the system is already operating, step 1604 may be omitted. After the system is awoken, the laser is turned on (step 1606) and the scan is started (step 1608). As the detector receives the reflected signal, decoding is attempted, as indicated by step 1609. The system continues to attempt to decode until decision box 1610 determines that a good decode has been made or decision box 1611 determines that either the maximum scan time has been reached or the user has released the button. If either condition is true, the laser is turned off as indicated by procedure 1612 and the program progresses to other activities.

If a good decode is made, the program proceeds to procedure 1614 where the laser is modulated with intermittent power. Such laser modulation creates a visible feedback to the user that a good decode has been made while maintaining a faint laser line that may be used to aid in alignment of the scanner with the next symbol to be scanned. The laser is modulated until either the maximum scan time is reached or the user releases the scan button, after which the laser is turned off as per procedure 1612.

After step 1614 begins, the program proceeds to step 1616 and turns on the indicator LED. Then the program proceeds to step 1618 and beeps a sound source that gives an audible indication of a good decode. The program then proceeds to step 1620 and turns off the LED. This arrangement results in an LED blink that is somewhat longer than the beep. After step 1620, the data is transmitted to the host or stored in memory, as indicated by step 1622. The methods for accomplishing step 1622 are discussed in detail elsewhere in this document.

The preceding overview, brief description of the drawings, and detailed description describe exemplary embodiments according to the present invention in a manner intended to foster ease of understanding by the reader. Other structures, methods, and equivalents may be within the scope of the invention. As such, the scope of the invention described herein shall be limited only by the claims.

What is claimed is:

1. A method for establishing a radio connection, comprising:
   receiving a first activation signal;
   applying power to radio hardware;
   entering a first discoverable mode for up to a first period of time;
   receiving a page from a first host via a radio connection;
   entering an active mode of communication with the first host;
   transmitting data to the first host;
   after data has been transmitted, negotiating a lower power mode with the first host and entering a sniff mode; and
   after a second period of time of not receiving a second activation signal, sending a disconnection message to the first host;
   removing power from the radio hardware to enter a sleep mode;
   receiving a single deactivation signal from not across the radio connection;
   resetting a stored first communication link identifier to a null value; and
   entering a second discoverable mode for up to a third period of time.

2. The method for establishing a radio connection of claim 1, further comprising:
   receiving a page from a second host via a radio connection;
   receiving a third communication link identifier from the second host;
   storing the third communication link identifier as the first communication link identifier in place of the null value; and
   entering an active mode of communication with the second host.

3. The method for establishing a radio connection of claim 1, further comprising:
   after not receiving a host page within the third period of time, entering the second discoverable mode, entering an initial state having a null value for the first communication link identifier; and
   turning off power to radio hardware and entering an initial state.

4. The method for establishing a radio connection of claim 3, wherein the deactivation signal is a long button press.

5. The method for establishing a radio connection of claim 1, wherein the deactivation signal consists of a single deactivation signal.

6. A wireless data collection device, comprising:
   a data collection engine operable to collect data from a portable data carrier and transmit a first signal corresponding to collected data;
   an electronic controller coupled to receive the first signal corresponding to the collected data and operable to direct a second signal corresponding to the collected data to a plurality of modules according to a schedule of priorities;
   a wireless interface module coupled to receive the second signal at a second priority and operable to transmit a third signal corresponding to the collected data wirelessly;
   a memory module coupled to receive the second signal at a third priority and operable to store in digital memory a representation of the second signal corresponding to the collected data; and
   a timer coupled to the electronic controller and operable to generate a retry signal;
   whereby the electronic controller is responsive to the timer to read the representation of the second signal from the memory module and direct the second signal to the wireless interface module.

7. The wireless data collection device of claim 6, further comprising a wired interface module coupled to receive the second signal at a first priority and operable to transmit a fourth signal corresponding to the collected data across a wired interface.

8. The wireless data collection device of claim 6, further comprising:
   a case enclosing the data collection engine, the controller, the wireless interface module, the memory module, and the timer; and
   a visible indicator on the case, coupled to the electronic controller, and operable to provide a visible indication to a user corresponding to the status of the wireless interface module.

9. The wireless data collection device of claim 6, wherein the data collection engine is a bar code scan engine.

10. The wireless data collection device of claim 6, wherein the wireless interface module is a radio interface module.

11. The wireless data collection device of claim 10, wherein the radio interface module is a Bluetooth radio module.

12. The wireless data collection device of claim 6, wherein the electronic controller and the timer are integrated.

13. The wireless data collection device of claim 6, wherein the memory module and the electronic controller are integrated.

14. The wireless data collection device of claim 6, wherein the memory module and the wireless interface module are integrated.

15. The wireless data collection device of claim 6, wherein the controller is operable, each time a new first signal is received from the data collection engine, to automatically read the representations of second signals corresponding to accumulated collected data from the memory module and direct the second signals to a module according to the priority schedule.

* * * * *